United States Patent
Liu et al.

(10) Patent No.: US 8,941,325 B2
(45) Date of Patent: Jan. 27, 2015

(54) LIGHT EMITTING DEVICE ARRAY DRIVER CIRCUIT AND CURRENT SPLITTER CIRCUIT AND METHOD OF SPLITTING CURRENT THEREFOR

(75) Inventors: Jing-Meng Liu, Zhubei (TW); Chiawei Liao, San Jose, CA (US)

(73) Assignee: Richtek Technologies Corporation, R.O.C., Chupei, Hsin-Chu (TW)

( * ) Notice: Subject to any disclaimer, the term of this patent is extended or adjusted under 35 U.S.C. 154(b) by 575 days.

(21) Appl. No.: 13/226,091

(22) Filed: Sep. 6, 2011

(65) Prior Publication Data

US 2012/0326613 A1 Dec. 27, 2012

Related U.S. Application Data

(60) Provisional application No. 61/381,172, filed on Sep. 9, 2010, provisional application No. 61/386,693, filed on Sep. 27, 2010, provisional application No. 61/390,263, filed on Oct. 6, 2010.

(51) Int. Cl.
*H05B 37/02* (2006.01)
*H05B 33/08* (2006.01)
*G09G 3/34* (2006.01)

(52) U.S. Cl.
CPC ............ *H05B 33/0815* (2013.01); *G09G 3/342* (2013.01); *H05B 33/0827* (2013.01); *G09G 2330/021* (2013.01); *Y02B 20/347* (2013.01)
USPC .......... 315/307; 315/185 R; 315/224; 315/308

(58) Field of Classification Search
USPC .............. 315/307, 308, 224, 291, 185 R, 191
See application file for complete search history.

(56) References Cited

U.S. PATENT DOCUMENTS

2011/0084734 A1* 4/2011 Russell et al. ................ 327/108

* cited by examiner

*Primary Examiner* — David H Vu
(74) *Attorney, Agent, or Firm* — Tung & Associates

(57) ABSTRACT

The present invention discloses a current splitter circuit for splitting a supply current to multiple light emitting device strings of a light emitting device array. The current splitter circuit includes: a minimum selector circuit coupled to the multiple light emitting device strings to generate a minimum signal which indicates a minimum voltage of the light emitting device strings; and multiple current source circuits each including a first current source end coupled to a corresponding light emitting device string, a second current source end coupled to ground, and a current source control end receiving a current control signal related to the minimum signal, so as to control currents through the corresponding light emitting device string.

49 Claims, 18 Drawing Sheets

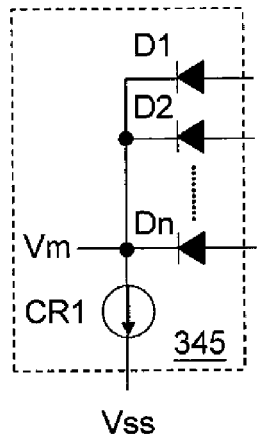
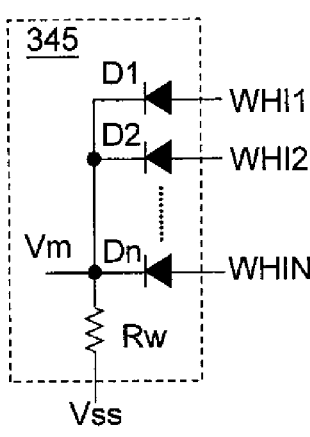
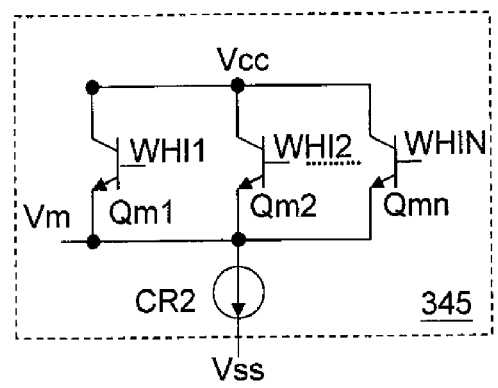
Fig. 24A     Fig. 24B     Fig. 24C
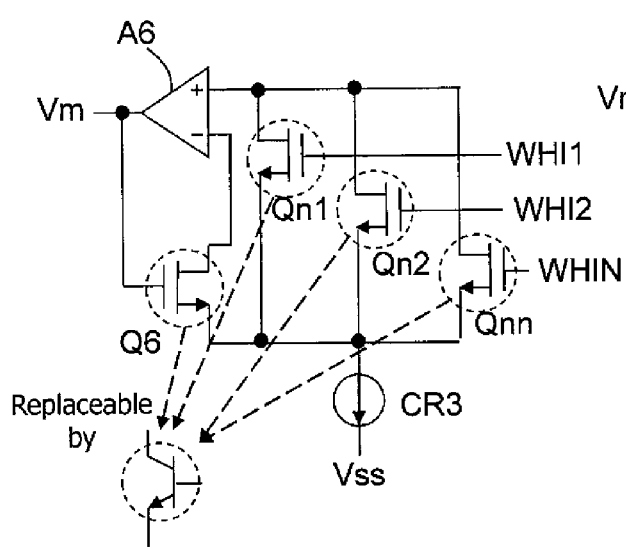
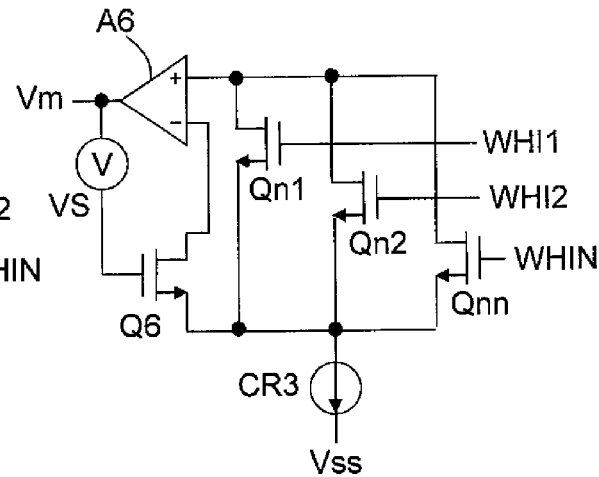
Fig. 24D     Fig. 24E

LIGHT EMITTING DEVICE ARRAY DRIVER CIRCUIT AND CURRENT SPLITTER CIRCUIT AND METHOD OF SPLITTING CURRENT THEREFOR

CROSS REFERENCE

The present invention claims priorities to U.S. provisional application No. 61/381,172, filed on Sep. 9, 2010; U.S. provisional application No. 61/386,693, filed on Sep. 27, 2010; and U.S. provisional application No. 61/390,263, filed on Oct. 6, 2010.

BACKGROUND OF THE INVENTION

1. Field of Invention

The present invention relates to a light emitting device array driver circuit, and a current splitter circuit and a method of splitting current for the light emitting device array driver circuit. In particular, the present invention relates to such driver circuit, current splitter circuit and method of splitting current which simplify the wiring and control of a power regulator circuit by providing a total supply current to the light emitting device array.

2. Description of Related Art

Light emitting devices, of which one typical example is LED (light emitting diode), are used in many applications. One application of light emitting devices is to arrange them in a array to provide backlight to a LCD (liquid crystal display). Referring to FIG. 1, to driver the light emitting device array 20, a power regulator 10 is required to provide a suitable supply voltage and supply currents to multiple strings of light emitting devices in the light emitting device array 20.

More specifically, as shown in FIG. 1, the power regulator 10 provides a supply voltage VLED to the light emitting device array 20. The light emitting device array 20 includes N light emitting device strings and each light emitting device string includes M light emitting devices, wherein M and N are positive integers. Each light emitting device string has a first end electrically connected to the power regulator 10 in common, and a second end electrically connected to a corresponding current source circuit 301 in a current control circuit 30. The current source circuit 301 controls the current of the light emitting device string connected thereto, so that the light emitting devices generate uniform light.

However, due to variations in manufacture, the voltages across light emitting devices are often different from one another and the difference may be as high as 10%, which is about 0.3V. Since the difference between the total voltage drop in one light emitting device string and the total voltage drop in another light emitting device string may be as high as 10%, if there are 20 light emitting devices in one light emitting device string, there may be a total difference of as high as 6V. For the current source circuits 301 to operate normally, the supply voltage VLED must be able to sustain the operation of the light emitting device string having the highest voltage drop. To this end, one method is to obtain a feedback signal from every light emitting device string and send the feedback signals to the power regulator 10, as shown in FIG. 1. However, this requires N signal wires between the light emitting device strings and the power regulator 10, and the power regulator 10 needs N additional pins, which are disadvantageous. In certain applications, there can only be two wires between the light emitting unit (including the light emitting device strings 20 and the current control circuit 30) and the power regulator 10, and in this case the prior art of FIG. 1 can not function.

FIGS. 2A-2C show several prior art circuit arrangements under the limitation that there can only be two wires between the light emitting device strings and the power regulator 10. In the prior art of FIG. 2A, the power regulator 11 provides the supply voltage VLED to the light emitting device array 20, and the current control circuit 31 only includes resistors R. As compared with the prior art of FIG. 1, the prior art of FIG. 2A reduces the number of wires connected to the power regulator 11, but it can not precisely control the uniformity of currents through all the light emitting device strings, that is, the currents through different light emitting device strings are very possibly different.

In the prior art of FIG. 2B, the current control circuit 32 includes a master current source circuit 322 which is connected to one of the light emitting device strings, and the other light emitting device strings are connected to circuits 321. The current of the master current source circuit 322 is mirrored to the circuits 321 so that currents through all the light emitting device strings are kept the same and uniform if the supply voltage VLED is sufficient to keep the current control circuit 32 normally working. However, this prior art does not properly feedback control the supply voltage VLED; if supply voltage VLED is not above a proper level, one or more of the circuits 321 may not operate normally, and the corresponding light emitting device string or strings can not operate normally to emit light with designed brightness. On the other hand, if the supply voltage VLED is set too high, it will result in undesired power loss and heat in the current control circuit 32. Furthermore, if the power regulator 11 supplies a regulated total current, the voltage VLED will be automatically established by the master current source circuit 322 and its corresponding LED string (referred to as the "master LED string"). In such a scenario, if the voltage drop of the master LED string is smaller than the voltage drop of any other LED string, the voltage VLED may not be sufficient for all LED strings and all current mirror circuits to work normally.

The prior art of FIG. 2C is similar to the prior art of FIG. 2B except that its current control circuit 33 further includes a circuit 332 for better controlling the circuits 321. In this circuitry, the master LED string is the LED string with connection to circuit 322, and its corresponding current source circuit is the master current source circuit. However, no matter whether the power regulator 11 supplies a regulated voltage or a regulated total current, the same problems happening in the prior art of FIG. 2B will happen in this prior art of FIG. 2C in the same manner.

In view of the above, the present invention provides a light emitting device array driver circuit, and a current splitter circuit and a method of splitting current for the light emitting device array driver circuit, wherein the supply voltage VLED is properly established by local feedback control, and the wiring of the power regulator is simplified.

SUMMARY OF THE INVENTION

One objective of the present invention is to provide a light emitting device array driver circuit.

Another objective of the present invention is to provide a current splitter circuit for use in the light emitting device array driver circuit.

Another objective of the present invention is to provide a method of splitting current in the light emitting device array driver circuit.

To achieve the above and other objectives, in one aspect, the present invention discloses a light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit comprising: a power regulator circuit electrically connected with the common node and a ground, for supplying a supply current to the light emitting device array; and a current splitter circuit for splitting the supply current among the light emitting device strings, the current splitter circuit comprising: a minimum selector circuit coupled to the second string ends of the light emitting device strings to sense voltages at the second string ends of the light emitting device strings, and generate a minimum signal which indicates a lowest voltage of the sensed voltages at the second string ends of the light emitting device strings; and a plurality of current source circuits, each current source circuit including: a first current source end, a second current source end, and a current source control end, wherein the first current source ends of the plurality of current source circuits are respectively coupled to the second string ends of the plurality of light emitting device strings; the second current source ends of the plurality of current source circuits are coupled to the ground; and the current source control ends of the plurality of current source circuits receive a current control signal related to the minimum signal, so as to control currents through the plurality of current source circuits and thereby control currents through the plurality of light emitting device strings.

In another aspect, the present invention discloses a current splitter circuit for use in a light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit including a power regulator circuit electrically connected with the common node and a ground, for supplying a supply current to the light emitting device array; the current splitter circuit splitting the supply current among the light emitting device strings, the current splitter circuit comprising: a minimum selector circuit coupled to the second string ends of the light emitting device strings to sense voltages at the second string ends of the light emitting device strings, and generate a minimum signal which indicates a lowest voltage of the sensed voltages at the second string ends of the light emitting device strings; and a plurality of current source circuits, each current source circuit including: a first current source end, a second current source end, and a current source control end, wherein the first current source ends of the plurality of current source circuits are respectively coupled to the second string ends of the plurality of light emitting device strings; the second current source ends of the plurality of current source circuits are coupled to the ground; and the current source control ends of the plurality of current source circuits receive a current control signal related to the minimum signal, so as to control currents through the plurality of current source circuits and thereby control currents through the plurality of light emitting device strings.

In one embodiment of the aforementioned light emitting device array driver circuit and the current splitter circuit, the current splitter circuit preferably further comprises a first bias circuit coupled between the current source control ends of the plurality of current source circuits and the minimum selector circuit to adjust the current control signal.

In one embodiment of the aforementioned light emitting device array driver circuit and the current splitter circuit, a gain circuit, which in one embodiment is an amplifier, may be disposed between the output of the minimum selector circuit and the current source control ends, to isolate the output signal of the minimum selector circuit from the signal received by the current source control ends such that the minimum selector circuit are not directly coupled to the current source control ends of the plurality of current source circuits. Additionally, a bias circuit can be inserted at an input or output end of the gain circuit to adjust the relationship between the output of the minimum selector circuit and the input of the current source control ends.

In one embodiment of the aforementioned light emitting device array driver circuit and the current splitter circuit, the minimum selector circuit preferably comprises multiple second bias circuits coupled to the second string ends of the light emitting strings respectively.

In one embodiment of the aforementioned light emitting device array driver circuit and the current splitter circuit, a dimming circuit is coupled to the current splitter circuit, the dimming circuit receiving a dimming signal and modulating the current control signal according to the dimming signal to control the brightness of the light emitting device array.

In one embodiment of the aforementioned light emitting device array driver circuit and the current splitter circuit, each of the current source circuits comprises: a transistor having a current inflow end, a current outflow end and a control end, the current inflow end being the first current source end; an amplifier having an output end controlling the control end of the transistor, the amplifier having a first input end which is the current source control end, and a second input end which is coupled to the current outflow end of the transistor; and a resistor having a first end coupled to the current outflow end of the transistor, and a second end which is the second current source end.

In another aspect, the present invention discloses a light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit comprising: a power regulator circuit electrically connected with the common node and a ground, for supplying a supply current to the light emitting device array; and a current splitter circuit for splitting the supply current among the light emitting device strings, the current splitter circuit comprising: a plurality of first current source circuits, each first current source circuit including: a first current source end, a second current source end, a voltage control end, and a working headroom index end, wherein the first current source ends of the plurality of first current source circuits are respectively coupled to the second string ends of the plurality of light emitting device strings; the second current source ends of the plurality of first current source circuits are coupled to the ground; the voltage control ends of the plurality of first current source circuits receive a current control signal related to a maximum signal, so as to control currents through the plurality of first current source circuits and thereby control currents through the plurality of light emitting device strings; and the working headroom index ends of the plurality of first current source circuits output a plurality of working headroom indices relating to voltages at the second string ends of the light emitting device strings respectively; a maximum selector circuit coupled to the working headroom index ends and outputting the maximum signal indicating a highest voltage of the working headroom indices; and a voltage-controlled voltage source circuit coupled to the maximum selector circuit for generating the current control signal according to the maximum signal.

In another aspect, the present invention discloses a current splitter circuit for use in a light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit including a power regulator circuit electrically connected with the common node and a ground, for supplying a supply current to the light emitting device array; the current splitter circuit splitting the supply current among the light emitting device strings, the current splitter circuit comprising: a plurality of first current source circuits, each first current source circuit including: a first current source end, a second current source end, a voltage control end, and a working headroom index end, wherein the first current source ends of the plurality of first current source circuits are respectively coupled to the second string ends of the plurality of light emitting device strings; the second current source ends of the plurality of first current source circuits are coupled to the ground; the voltage control ends of the plurality of first current source circuits receive a current control signal related to a maximum signal, so as to control currents through the plurality of first current source circuits and thereby control currents through the plurality of light emitting device strings; and the working headroom index ends of the plurality of first current source circuits output a plurality of working headroom indices relating to voltages at the second string ends of the light emitting device strings respectively; a maximum selector circuit coupled to the working headroom index ends and outputting the maximum signal indicating a highest voltage of the working headroom indices; and a voltage-controlled voltage source circuit coupled to the maximum selector circuit for generating the current control signal according to the maximum signal.

In one embodiment of the aforementioned light emitting device array driver circuit and the current splitter circuit, the voltage-controlled voltage source circuit comprises: a voltage-controlled current source circuit coupled to the maximum selector circuit for receiving the maximum signal and generating a maximum current; and a current-to-voltage conversion circuit coupled between the voltage-controlled current source circuit and the voltage control ends of the plurality of first current source circuits, the current-to-voltage conversion circuit converting the maximum current to the current control signal.

In one embodiment of the aforementioned light emitting device array driver circuit and the current splitter circuit, each of the first current source circuits comprises: a transistor having a current inflow end, a current outflow end and a control end, the current inflow end being the first current source end, the control end being coupled to the working headroom index end; an amplifier having an output end controlling the control end of the transistor, the amplifier having a first input end which is the voltage control end, and a second input end which is coupled to the current outflow end of the transistor; and a resistor having a first end coupled to the current outflow end of the transistor, and a second end which is the second current source end.

In one embodiment of the aforementioned light emitting device array driver circuit and the current splitter circuit, the maximum selector circuit comprises: a plurality of diodes having anodes coupled to the working headroom index ends respectively to receive the working headroom indices, and cathodes coupled to a maximum selector circuit output end to output the maximum signal; and a second current source or a resistor coupled between the maximum selector circuit output end and the ground.

In one embodiment of the aforementioned light emitting device array driver circuit and the current splitter circuit, the maximum selector circuit is a highest voltage follower. One embodiment of the maximum selector circuit comprises: a plurality of first N-type transistors each having a control end coupled to a corresponding one of the working headroom index ends, a current outflow end coupled to a first common node, and a current inflow end coupled to a second common node; a differential amplifier circuit having an input end coupled to the second common node, and an output end for outputting the maximum signal; a second N-type transistor having a current inflow end coupled to another input end of the differential amplifier circuit, a current outflow end coupled to the first common node, and a control end coupled to the output end of the differential amplifier circuit; and a second current source coupled between the first common node and the ground.

In one embodiment of the aforementioned light emitting device array driver circuit and the current splitter circuit, the maximum selector circuit comprises: a plurality of BJTs each having a base coupled to a corresponding one of the working headroom index ends, a collector coupled to a supply voltage, and an emitter coupled to a common emitter node for outputting the maximum signal; and a second current source or a resistor coupled between the emitter common node and the ground.

In another aspect, the present invention discloses a method for splitting current in a light emitting device array, the light emitting device array including a plurality of light emitting device strings, each light emitting device string including a plurality of light emitting devices and having a first string end and a second string end, the first string ends of the light emitting device strings being connected to a common node, the method comprising: providing a total supply current to the common node; regulating the total supply current according to a sense signal sensing the total supply current; sensing voltages at the second string ends of the light emitting device strings and outputting a minimum signal which indicates a lowest voltage of the sensed voltages at the second string ends of the light emitting device strings; generating a current control signal relating to the minimum signal; and controlling currents through the light emitting device strings according to the current control signal, so as to split the total supply current to the light emitting device strings.

In another aspect, the present invention discloses a method for splitting current in a light emitting device array, the light emitting device array including a plurality of light emitting device strings, each light emitting device string including a plurality of light emitting devices and having a first string end and a second string end, the first string ends of the light emitting device strings being connected to a common node, the method comprising: providing a total supply current to the common node; regulating the total supply current according to a sense signal sensing the total supply current; generating a plurality of working headroom indices relating to voltages at the second string ends of the light emitting device strings respectively; generating a maximum signal indicating a highest voltage of the working headroom indices, which relates to the lowest voltage at the second string ends of the light emitting device strings; generating a current control signal according to the maximum signal; and controlling currents through the light emitting device strings according to the current control signal.

The objectives, technical details, features, and effects of the present invention will be better understood with regard to the detailed description of the embodiments below.

BRIEF DESCRIPTION OF THE DRAWINGS

FIGS. 24A-24E show several more specific embodiments of the maximum selector circuit 345.

DESCRIPTION OF THE PREFERRED EMBODIMENTS

Figure 1:
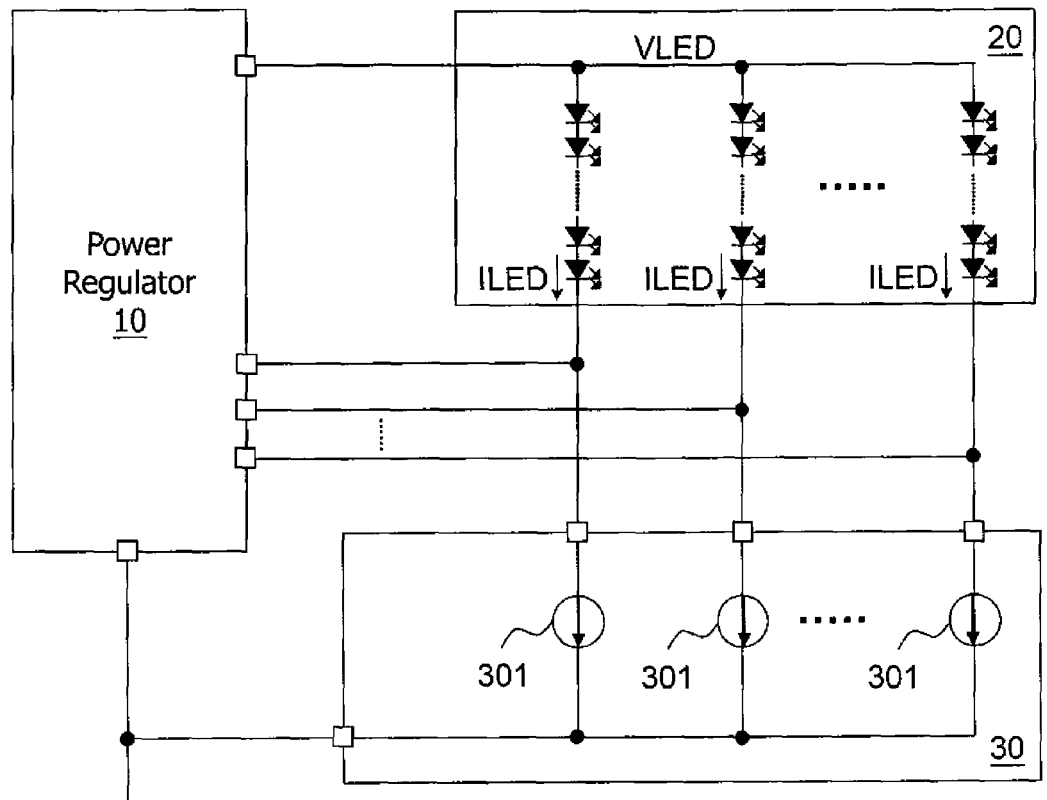
FIG. 1 shows a schematic diagram of a prior art light emitting device array driver circuit.
Figure 2A:
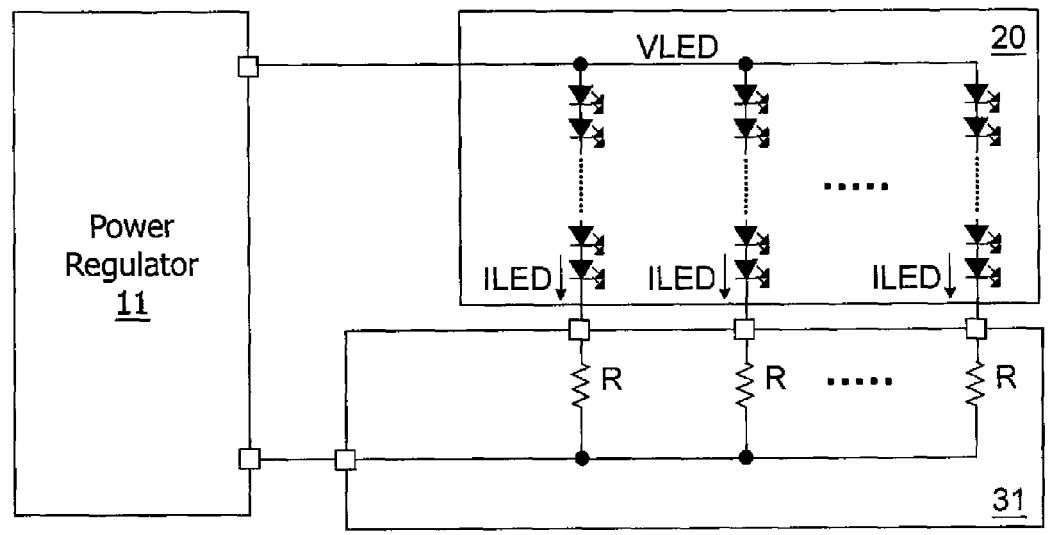
FIGS. 2A-2C shows schematic diagrams of several other prior art light emitting device array driver circuits.
Figure 2B:
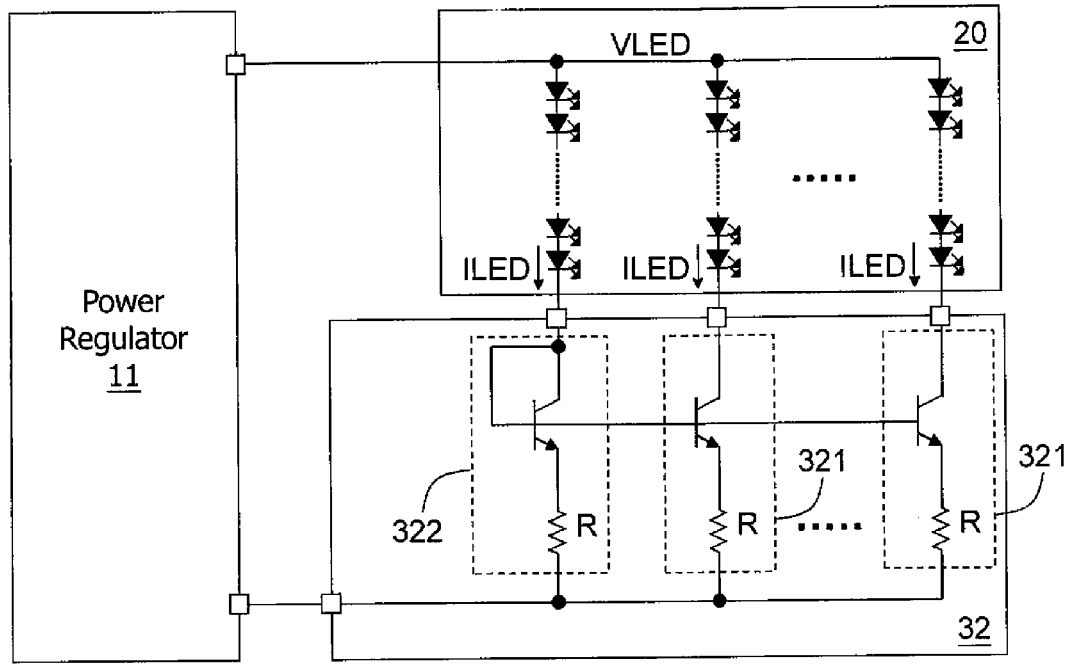
Figure 2C:
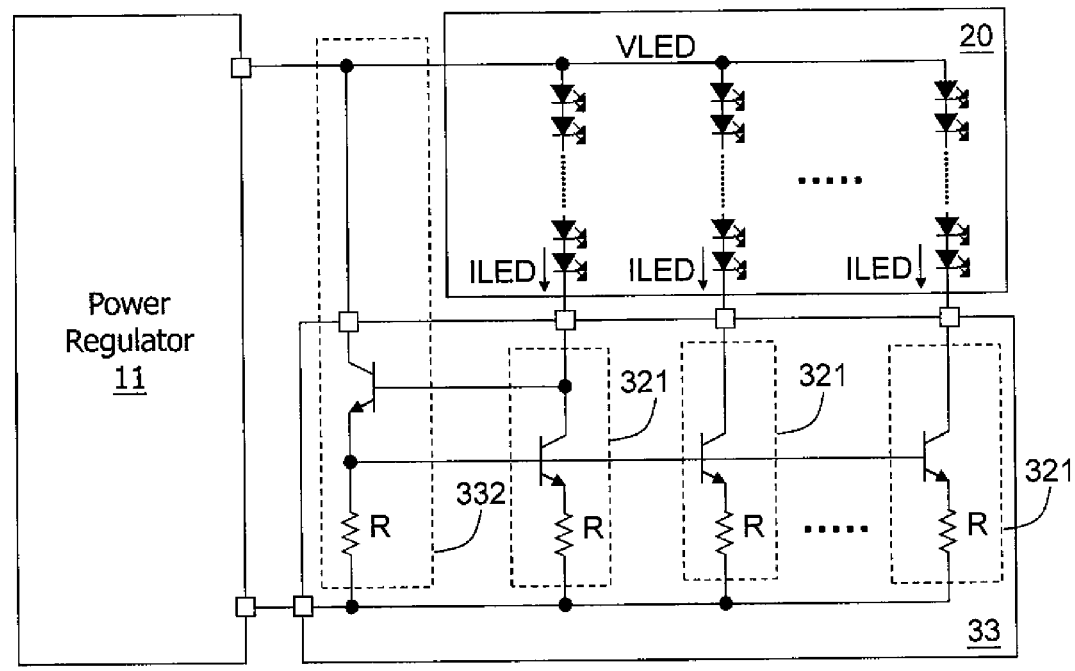
Figure 3:
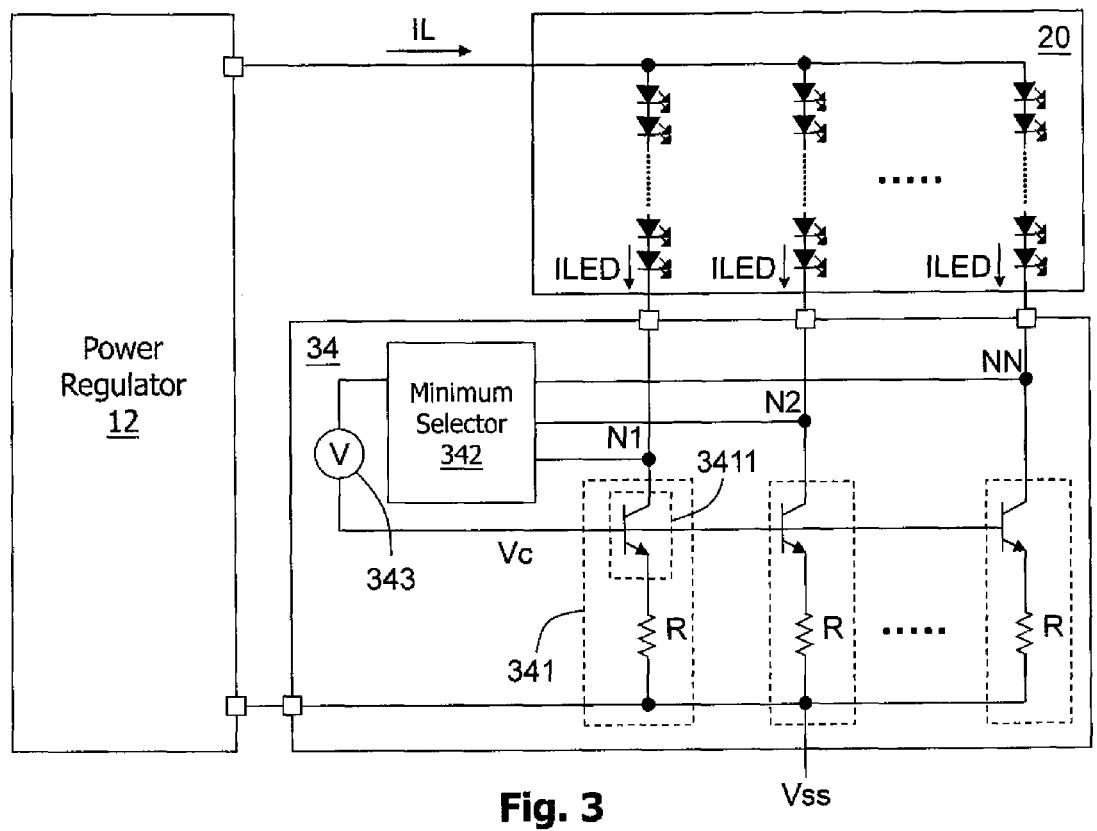
FIG. 3 shows an embodiment of the present invention.

Please refer to FIG. 3 which shows a first embodiment of the present invention. As shown in FIG. 3, a power regulator 12 provides a supply current IL to the light emitting device array 20. The light emitting device array 20 includes multiple light emitting device strings. Each light emitting device string has a first end electrically connected to the power regulator 12 in common, and a second end electrically connected to a first end (nodes N1-NN) of a corresponding current source circuit 341 in a current splitter circuit 34. Besides electrically connected to the first ends of the light emitting device strings the power regulator 12 is also electrically connected to a ground level (Vss) so that a current loop is formed to provide a supply current IL to the light emitting device array 20. One feature of the present invention is that the current splitter circuit 34 includes a minimum selector circuit 342 which senses voltages at the nodes N1-NN and generates a minimum signal indicating a lowest voltage among them (the lowest voltage corresponds to a light emitting device string having the highest voltage drop). The current splitter circuit 34 generates a current control signal according to the minimum signal, to control the current source circuits 341 such that the current source circuit 341 corresponding to the light emitting device string having the highest voltage drop can operate normally, and thus all the current source circuits 341 can operate normally. Only two pins and two wires are required for the power regulator 12 to connect to the light emitting device array 20 and the current splitter circuit 34 (to provide a current loop for the supply current IL), so the wiring is simple. In this embodiment, the current splitter circuit 34 includes the current source circuit 341, the minimum selector circuit 342, and a first bias circuit 343. In a preferred embodiment, the current splitter circuit 34 is integrated in an integrated circuit (IC) chip. However, any circuit or device in the current splitter circuit 34, such as the resistor R in the current source circuit 341, can be provided external to the IC chip if desired.

Still referring to FIG. 3, each current source circuit 341 includes a first current source end coupled to the second end (node N1-NN) of a corresponding light emitting device string, a second current source end coupled to the ground level (Vss), and a current source control end which receives the current control signal Vc for controlling current through the current source circuit 341. In this embodiment, the current source circuit 341 includes a bipolar junction transistor (BJT) 3411 and a resistor R, but the present invention is not limited to this embodiment; the current source circuit can be embodied in a different form, and the transistor is not limited to BJT (which can be replaced by a field effect transistor, FET). More examples of the current source circuits will be described later. Optionally, the current splitter circuit 34 may or may not include the first bias circuit 343. In this embodiment, the first bias circuit 343 is coupled between the minimum selector circuit 342 and the current source circuit 341, so as to provide a bias voltage between them as required, wherein the bias voltage can be a positive or a negative value. The first bias circuit 343 can be omitted, that is, the bias voltage can be zero, or the bias voltage can be provided inherently in a circuit or a device performing another function in the current splitter circuit 34. In fact, throughout the specification of the present invention where any bias circuit is shown, it is intended for such bias circuit to represent a bias voltage in a signal path where the bias circuit is located, while bias voltage does not have to be embodied by a standalone physical unit. The bias voltage can provide effects such as: if the current source circuit 341 includes BJTs as shown in FIG. 3, the bias voltage can be used to adjust the current control signal Vc, so that the BJTs operate around the lower boundary of the active region; that the BJTs operate in the active region ensures that the current source circuits 341 operate normally, and that the BJTs operate around the lower boundary of the active region keeps the current source circuits 341 operating by minimum operating voltage to reduce the power consumption. Similarly, if the current source circuit 341 includes FETs, the bias voltage can be used to adjust the current control signal Vc, so that the FETs operate around the lower boundary of the saturation region. The output from the minimum selector circuit 342, which is the minimum signal corresponding to the lowest voltage among nodes N1-NN, is added by the bias voltage provided by the first bias circuit 343, and the sum (which is the current control signal Vc) is sent to the current source control ends of the current source circuits 341; in this embodiment, the current source control end is the control end of the transistor 3411 (the base of a BJT or the gate of an FET). The current control signal Vc controls the current source circuits 341 to generate the desired currents for the light emitting device strings. When the current source circuit 341 corresponding to the lowest voltage among nodes N1-NN can operate normally, all other current source circuits 341 must be able to operate normally for sure.

Figure 4A:
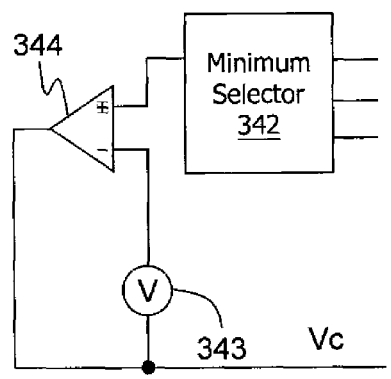
FIGS. 4A and 4B show another embodiment of the present invention.
Figure 4B:
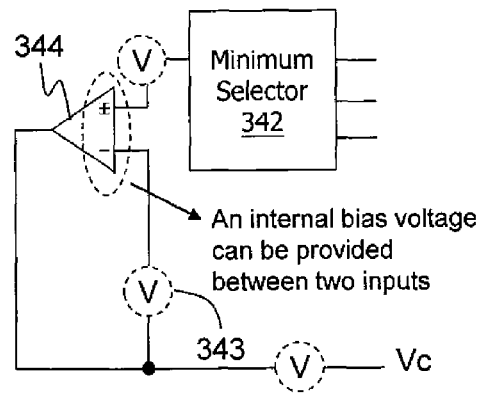

FIG. 4A shows a second embodiment of the present invention. The current splitter circuit 34 may further comprise a gain circuit 344, which is an amplifier in this embodiment as shown in the figure. The amplifier has a first input coupled to the minimum selector circuit 342 for receiving the minimum signal, and an output which is feedback coupled to its second input. Optionally, a first bias circuit 343 may be provided between the second input and the output for adjusting the current control signal Vc outputted from the gain circuit 344 so that the current source circuit 341 is better controlled as explained in the above. The location of the first bias circuit 343 is not limited to the location as shown in FIG. 4A. Referring to FIG. 4B, the first bias circuit 343 can be provided at any one or more locations shown in the figure; or, the first bias circuit 343 may be omitted, and an inherent bias voltage may be provided between two inputs of the gain circuit 344, or provided in the minimum selector circuit 342. The gain circuit 344 isolate the output of the gain circuit 344 from the control end of the current source circuit 341 so that they are not directly connected, to avoid loading effect or other interferences.

Figure 5A:
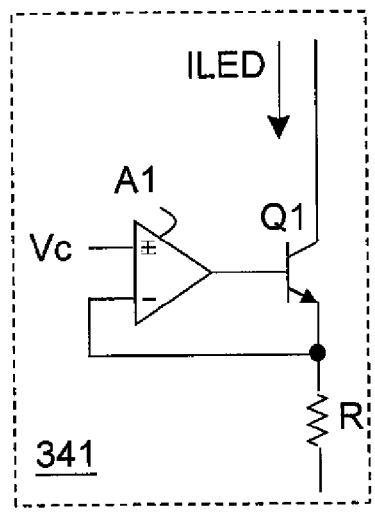
FIGS. 5A and 5B show two other embodiments of the present invention.
Figure 5B:
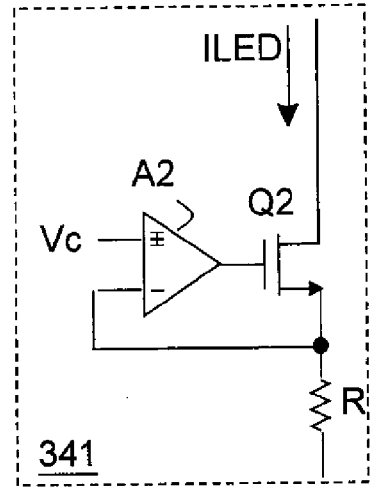

FIGS. 5A and 5B show a third and a fourth embodiments of the present invention. As shown in the FIG. 5A, the current source circuit 341 for example includes a BJT Q1, an amplifier A1 and a resistor R; or as shown in the FIG. 5B, the current source circuit 341 for example includes an FET Q2, an amplifier A2 and a resistor R. The two inputs of the amplifier (A1 or A2) receive the voltage at the current outflow end of the transistor (Q1 or Q2) and the current control signal Vc; the output of the amplifier (A1 or A2) controls the control end of the transistor (Q1 or Q2). At balanced state, the voltage at the current outflow end of the transistor (Q1 or Q2) is equal to the current control signal Vc, so the current ILED is equal to the voltage across the resistor R divided by the resistance of the resistor R, i.e., the voltage Vc (in this embodiment the current control signal Vc is a voltage signal for controlling current) divided by the resistance of the resistor R.

Figure 6:
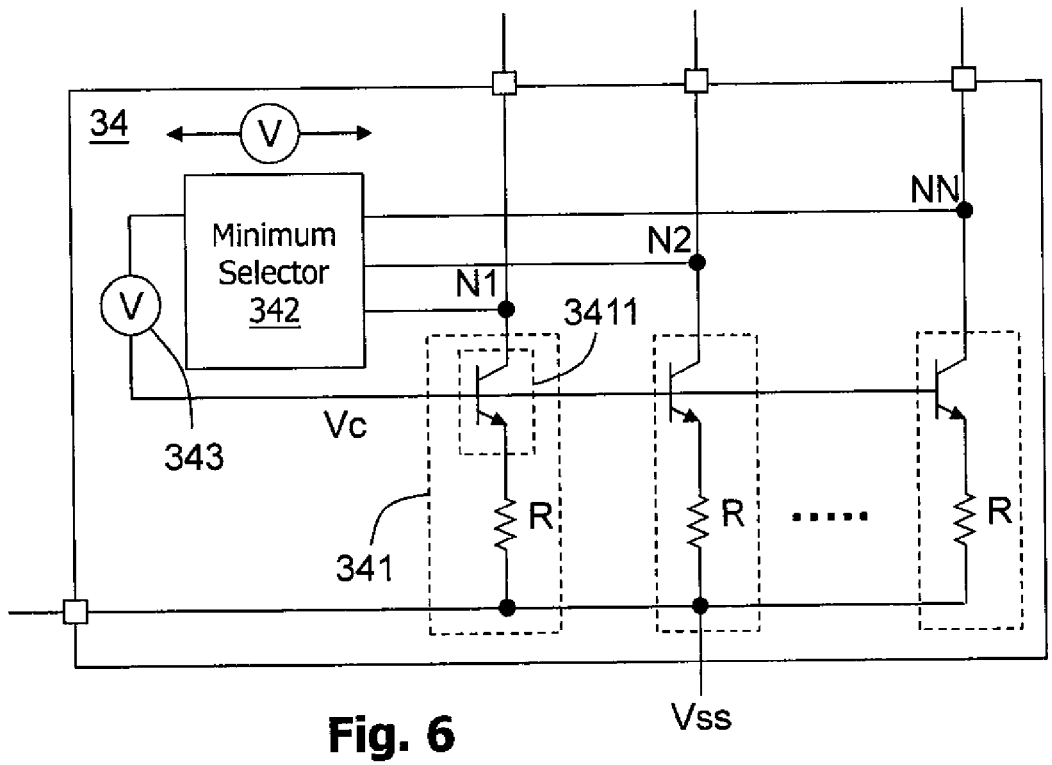
FIG. 6 shows yet another embodiment of the present invention.
Figure 7:
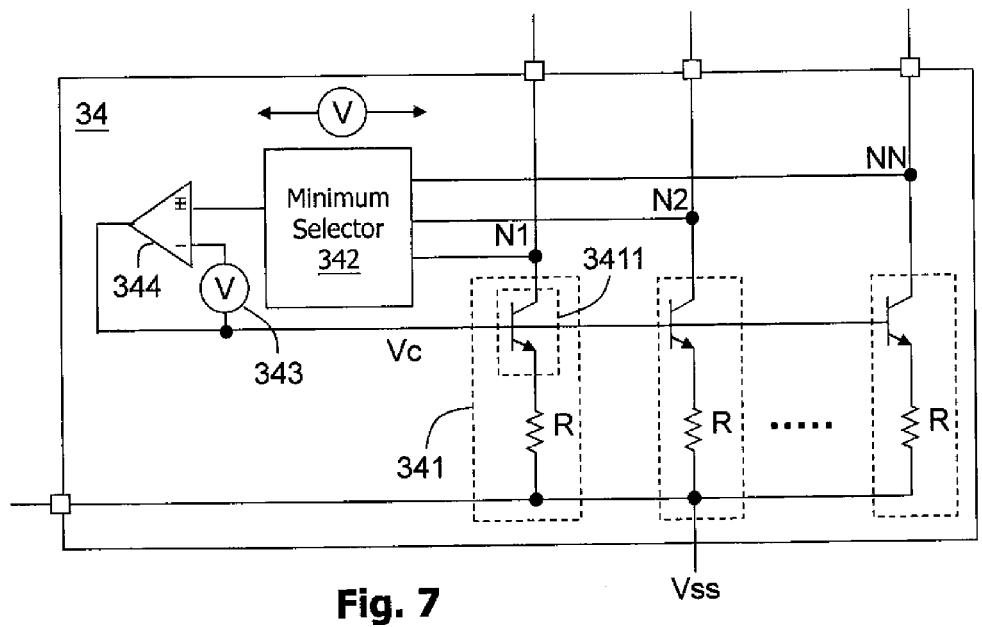
FIG. 7 shows a further other embodiment of the present invention.

The function of the minimum selector circuit 342 is to generate a current control signal for controlling the current source circuit 341 according to the lowest voltage among the nodes N1-NN; however, the output of the minimum selector circuit 342 (i.e., the minimum signal) does not have to be equal to the lowest voltage among the nodes N1-NN. FIGS. 6 and 7 are a fifth and a six embodiments of the present invention, which show that there can be an inherent bias voltage between the input and output of the minimum selector circuit 342. In the embodiment of FIG. 7, the current splitter circuit 34 further includes the gain circuit 344.

Figure 8:
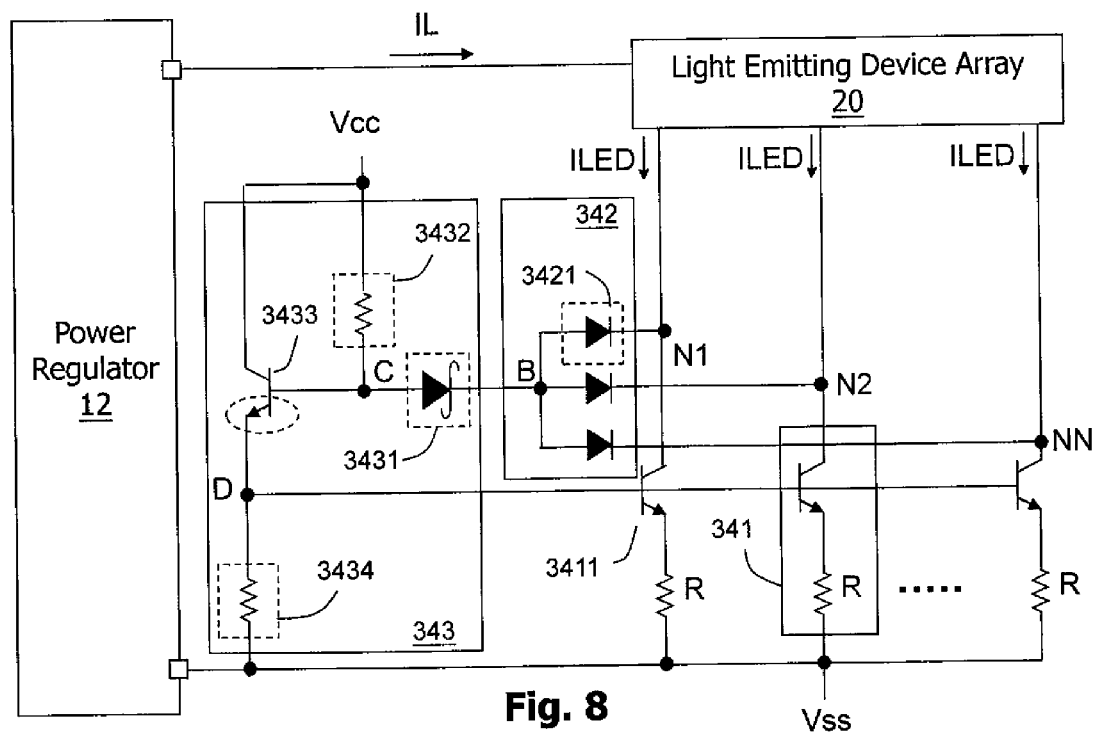
FIG. 8 shows yet another embodiment of the present invention.

FIG. 8 shows an eighth embodiment of the present invention, in which the minimum selector circuit 342 and the first bias circuit 343 are shown in more detail as an example. As shown in the figure, the minimum selector circuit 342 includes multiple second bias circuits 3421, coupled between the second ends (nodes N1-NN) of the light emitting device strings and a node B respectively. In this embodiment, the second bias circuit 3421 for example can be a diode having a cathode coupled to the second end of the corresponding light emitting device string, and thus the voltage at the node B will be the lowest voltage among the nodes N1-NN plus the voltage across the diode. The second bias circuit 3421 is not limited to the diode as shown; it can be embodied as other devices, which will be described later.

In this embodiment, the first bias circuit 343 includes a third bias circuit 3431, a fourth bias circuit 3433, and circuit devices 3432 and 3434. One end of the third bias circuit 3431 is coupled to the output (node B) of the minimum selector circuit 342. The third bias circuit 3431 is optional, that is, it may be omitted; the purpose to provide this third bias circuit 3431 is to adjust the voltage difference between the output of the minimum selector circuit 342 and the control end of the current source circuit 341. In this embodiment, the third bias circuit 3431 for example is a Schottky diode having a cathode coupled the second bias circuits 3421 (the anodes of the diodes in this embodiment). The circuit device 3432 is coupled between a positive voltage Vcc and another end of the third bias circuit 3431 (node C, which is the anode of the Schottky diode in this embodiment). The voltage Vcc can be any proper positive voltage, one example of which is the output from the power regulator 12. The purpose of the circuit device 3432 is to provide an operating current such that the voltage at the node C can be decided by the lowest voltage among the nodes N1-NN. The fourth bias circuit 3433 is coupled between the node C and the control end (node D) of the current source circuit 341. In this embodiment the fourth bias circuit 3433 for example is a BJT having a base coupled to the another end (node C) of the third bias circuit 3431, wherein the base-emitter junction of the BJT has a constant bias voltage VBE, so that there is a voltage difference between the node C and node D. The circuit device 3434 is coupled between the node D and the ground level Vss, for providing an operating current to the BJT (3433). The third bias circuit 3431 and the circuit devices 3432 and 3434 are not limited to what are shown in the embodiment; they can be embodied in other forms, which will be described later.

This embodiment operates as the following. For the current source circuit 341 to operate normally, the voltage at the node D should preferably be higher than the base-emitter voltage VBE (typically 0.7V) of the BJT 3411 plus the voltage across the resistor R, so the voltage at the node D for example can be controlled at around 0.8V. The second bias circuit 3421 is a diode having a voltage of 0.7V, while the base-emitter voltage VBE of the BJT 3433 is also 0.7V but in a reverse direction, so the two are cancelled with each other. Therefore, the third bias circuit 3431 can be chosen according to the voltage at the node D, such as 0.8V as mentioned above, so as to control the lowest voltage among the nodes N1-NN at a proper voltage level, such as around 0.5V. For example, assuming that the voltages at the nodes N2 and NN are higher than the voltage at the node N1 by 0.1V and 0.2V respectively, and the voltage at the node N1 is the lowest voltage among the nodes N1-NN, then the voltage at the node N1 can be controlled at around 0.5V if the voltage at the node D is 0.8V, by setting the third bias circuit 3431 to compensate a voltage of 0.3V. More specifically, because the voltage at the node N1 which is the lowest, the voltage at the node B is 1.2V (0.5V plus a diode voltage of 0.7V), and of all the second bias circuits 3421, only the second bias circuit 3421 which is coupled to the node N1 is conducting, while all the other second bias circuits 3421 are not conducting because the voltages across them do not reach 0.7V. The third bias circuit 3431 is a Schottky diode having a forward bias voltage of 0.3V, so the voltage at the node C is 1.5V. The base-emitter voltage VBE of the BJT 3433 is 0.7V, so it is verified that the voltage at the node D is 0.8V. The voltage at the node D is the current control signal Vc for controlling the current source circuits 341.

The actual value of the voltage at the node D is controlled by the negative feedback mechanism of the current splitter circuit. The power regulator 12 outputs a constant supply current IL, and the current splitter circuit splits this supply current IL to all the light emitting device strings, each light emitting device string having a current controlled by a corresponding current source circuit 341 connected thereto. Assuming that in the beginning, the total current as a sum of all the currents of the current source circuits 341 is smaller than IL, the voltages at the nodes N1-NN will rise up, so that the voltages at the nodes B, C and D will rise up until the total current of all the current source circuits 341 is equal to IL. On the other hand, if the total current of all the current source circuits 341 is larger than IL, the voltages at the nodes N1-NN will drop, so that the voltages at the nodes B, C and D will drop until the total current of all the current source circuits 341 is equal to IL.

The second bias circuit 3421, the third bias circuit 3431, and the circuit devices 3432 and 3434 are not limited to what are shown in FIG. 8. FIGS. 9A-9G show several other embodiments of the second bias circuit 3421 and the third bias circuit 3431. As shown in FIGS. 9A-9G, the second bias circuit 3421 and the third bias circuit 3431 can be, for example but are not limited to, diode, Schottky diode, resistor, PNPBJT having a collector coupled to the ground, PNPBJT having a collector coupled to a base thereof, NPNBJT having a collector coupled to a supply voltage, and NPNBJT having a collector coupled to a base thereof, or a combination of two or more of the above devices (wherein the third bias circuit 3431 can be a pure resistor while the second bias circuit 3421 should not be a pure resistor). In the figures, the node a indicates where the second bias circuit 3421 is connected to the node B or where the third bias circuit 3431 is connected to the node C; the node b indicates where the second bias circuit 3421 is connected to the nodes N1-NN or where the third bias circuit 3431 is connected to the node B.

Figure 9A:
FIGS. 9A-9G show several embodiments of the second bias circuit 3421 and the third bias circuit 3431.
Figure 9D:
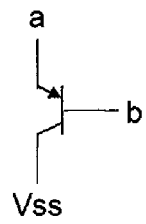
Figure 9F:
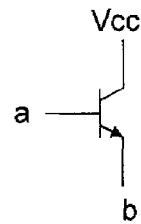
Figure 9H:
FIGS. 9H-9I show several embodiments of the circuit devices 3432 and 3434.
Figure 9B:
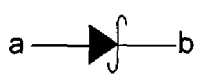
Figure 9E:
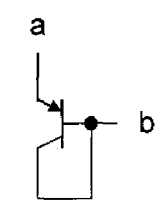
Figure 9G:
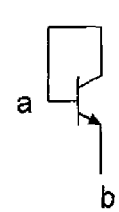
Figure 9I:
Figure 9C:
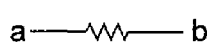

FIGS. 9H-9I show several other embodiments of the circuit devices 3432 and 3434. As shown in FIGS. 9H-9I, the circuit devices 3432 and 3434 can be, for example but are not limited to, resistor or constant current source, or a combination thereof.

Figure 10A:
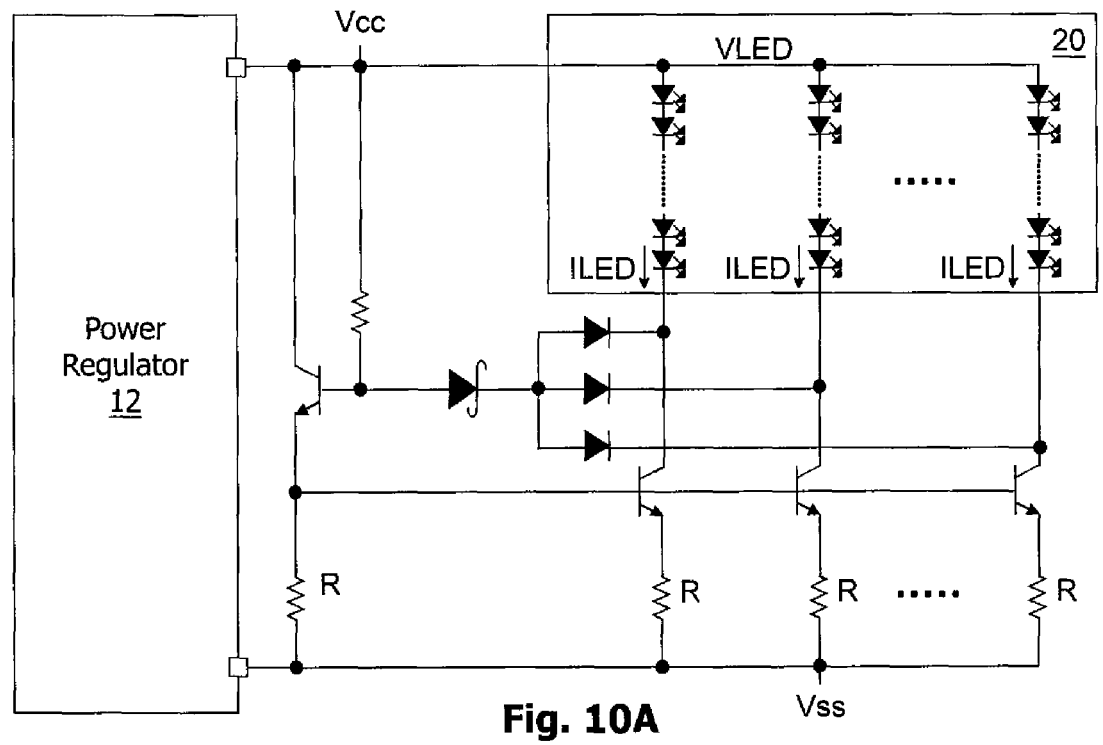
FIG. 10A shows another embodiment of the present invention.

FIG. 10A shows an example that the voltage Vcc adopts the voltage VLED provided by the power regulator 12, which is a positive voltage readily available. However as mentioned above, the voltage Vcc can be any other proper positive voltage instead of the voltage VLED.

Figure 10B:
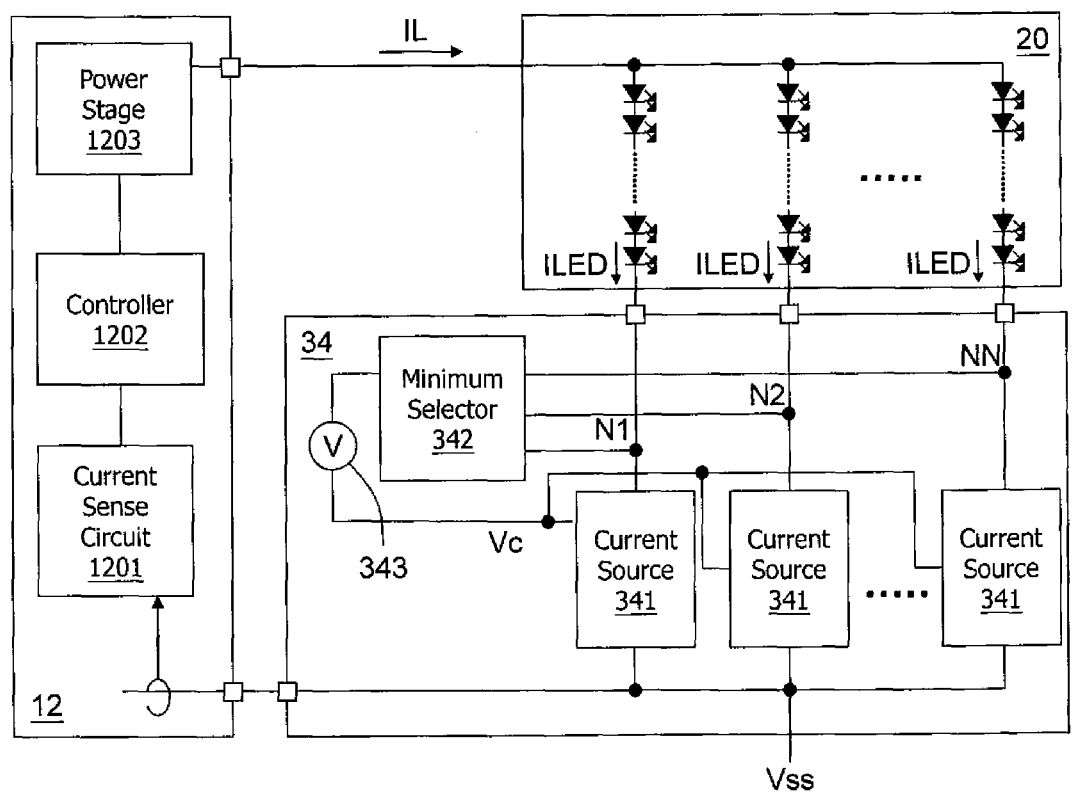
FIG. 10B illustrates a basic structure of the power regulator 12.

FIG. 10B shows a basic structure of the power regulator 12, which includes a current sense circuit 1201, a controller 1202 and a power stage circuit 1203. The current sense circuit 1201 senses the supply current IL which is supplied to the light emitting device array 20 (the sensing location is not limited to what is shown in the figure, which will be described later), and generates an output signal feeding back the information to the controller 1202. The controller 1202 generates a control signal controlling the power stage circuit 1203 according to the output signal of the current sense circuit 1201, so that the power stage circuit 1203 provides desired output current to the light emitting device array 20.

Figure 11:
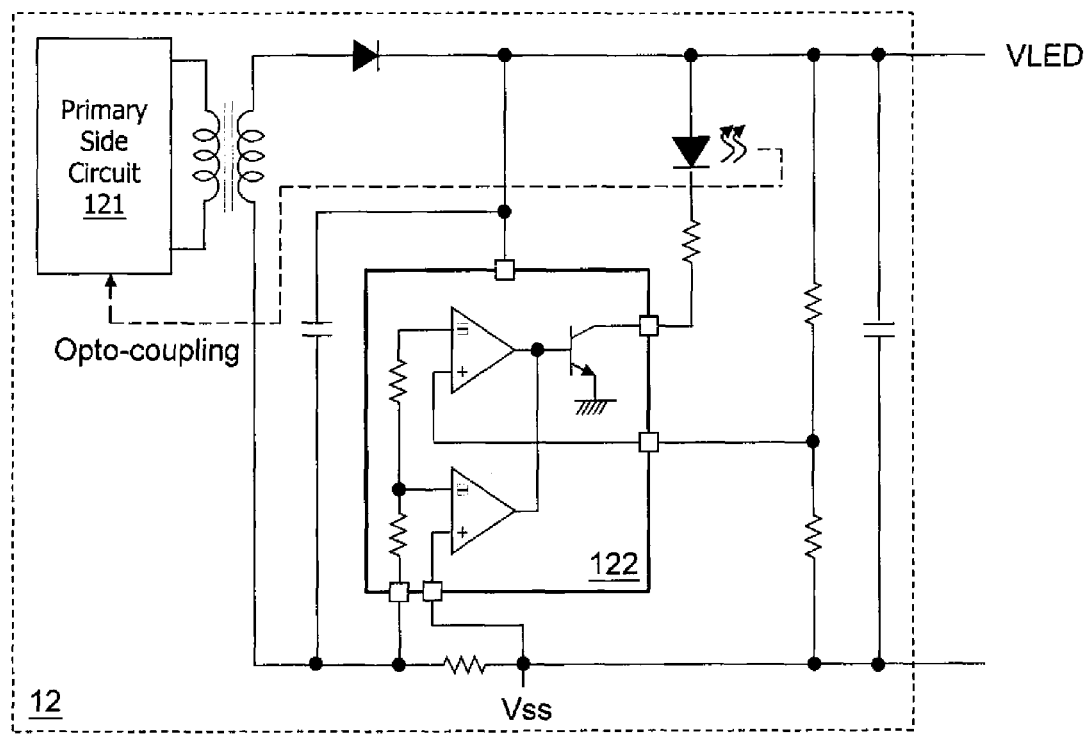
FIG. 11 shows yet another embodiment of the present invention.

FIG. 11 shows an embodiment of the power regulator 12, wherein the power regulator 12 is, for example but are not limited to, an AC-DC converter including a primary side circuit 121 and a constant current/limited voltage conversion control circuit 122. The constant current/limited voltage conversion control circuit 122 for example can be integrated as an IC chip.

Figure 12A:
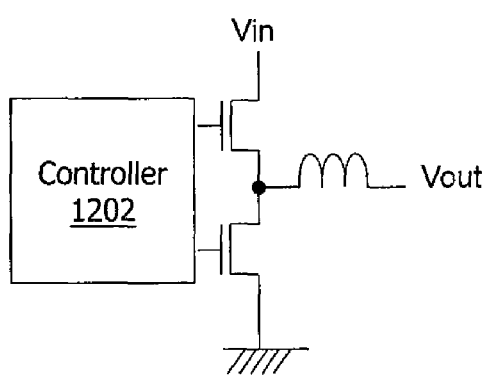
FIGS. 12A and 12B show examples of buck switching regulators.
Figure 12B:
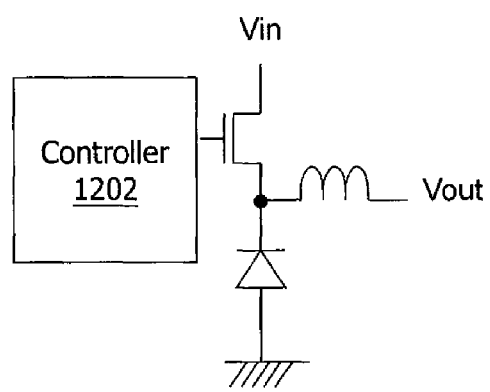
Figure 13A:
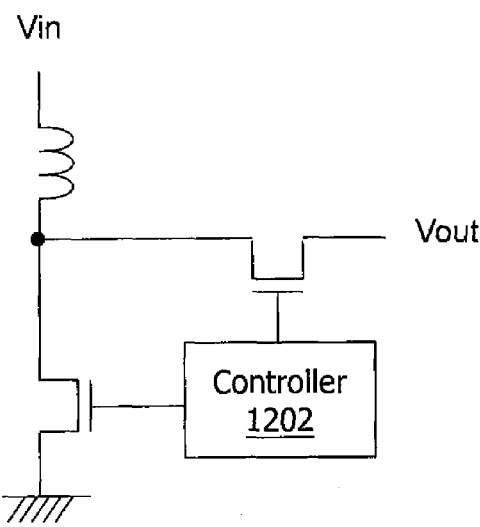
FIGS. 13A and 13B show examples of boost switching regulators.
Figure 13B:
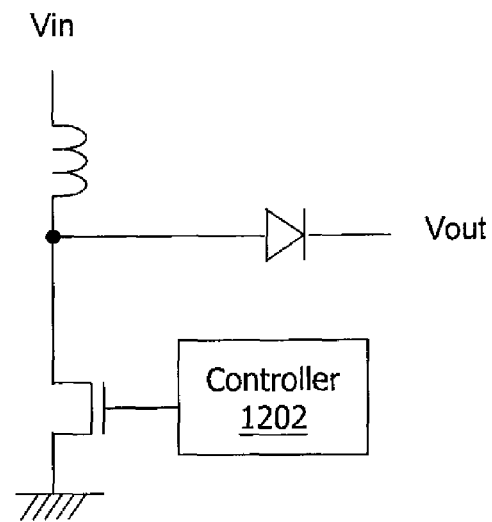
Figure 14A:
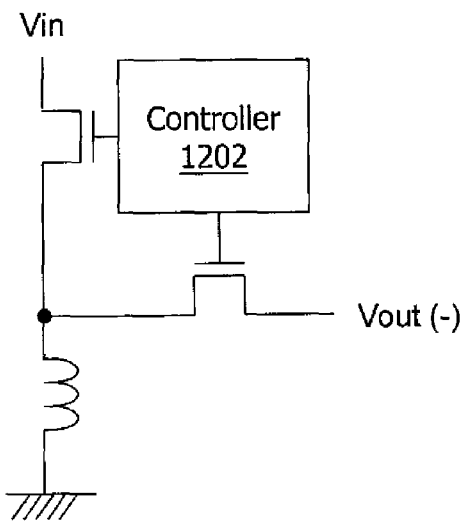
FIGS. 14A and 14B show examples of inverting switching regulators.
Figure 14B:
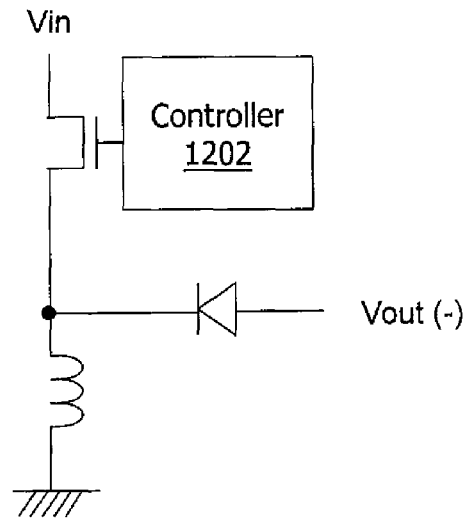
Figure 15A:
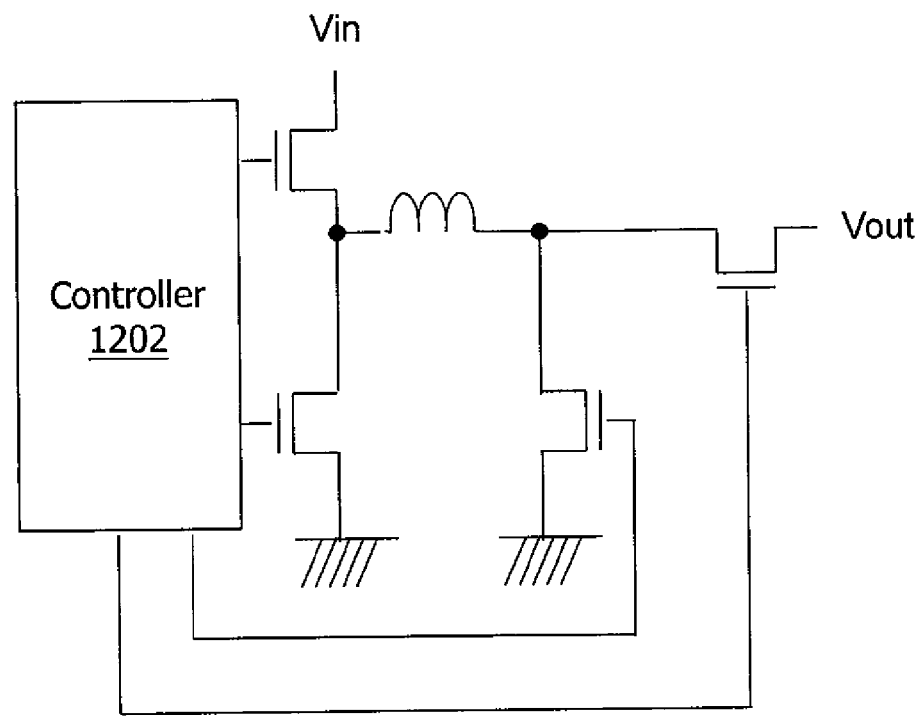
FIGS. 15A and 15B show examples of buck-boost switching regulators.
Figure 15B:
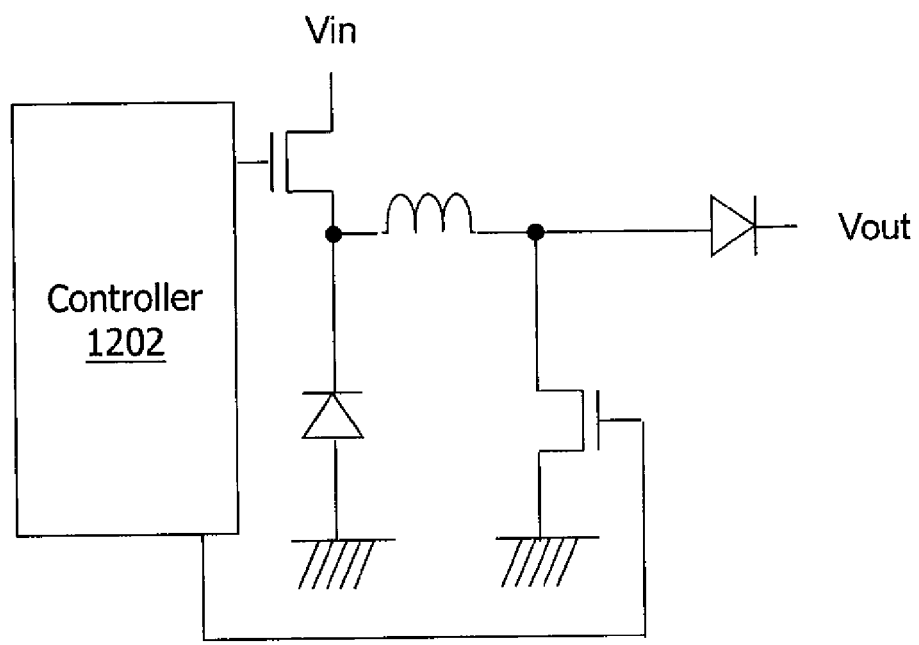
Figure 16A:
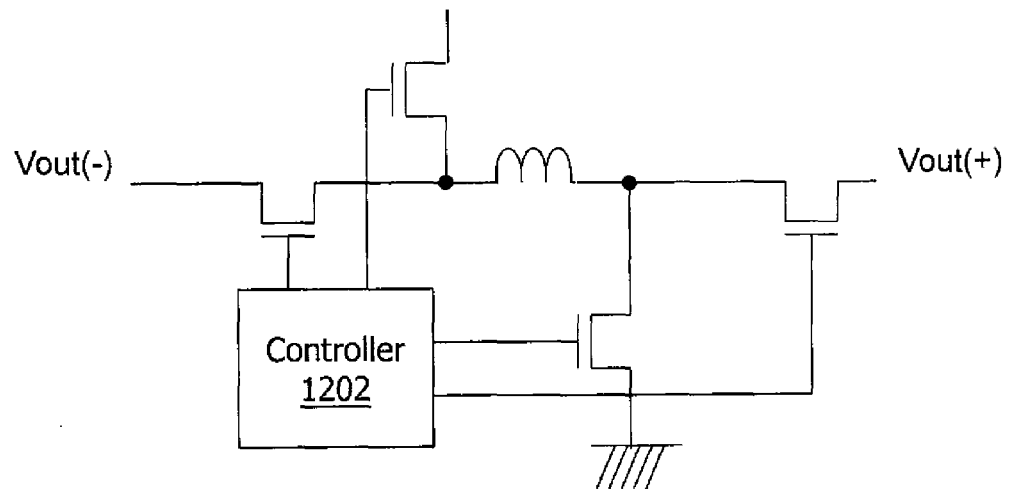
FIGS. 16A and 16B show examples of inverting-boost switching regulators.
Figure 16B:
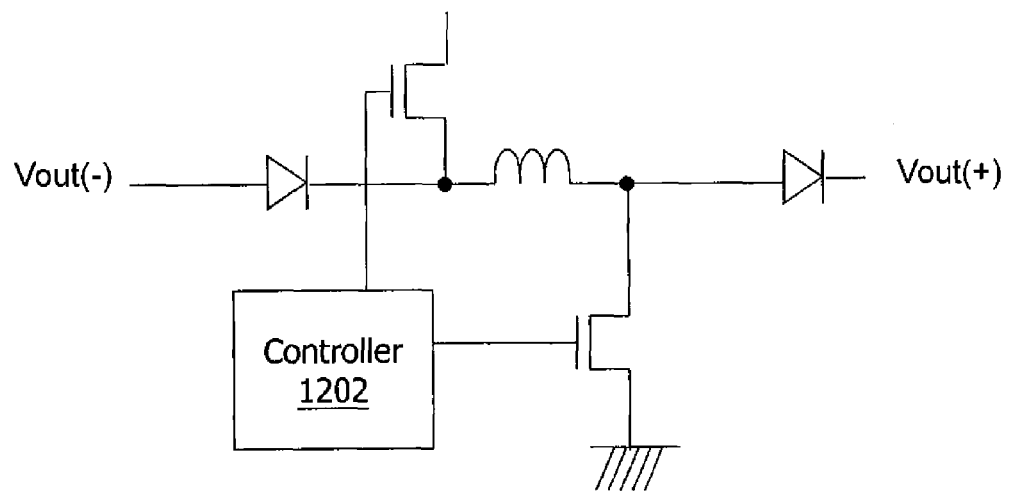

Instead of the AC-DC converter as shown in FIG. 11, the power regulator 12 can be a DC-DC converter. For example, the controller 1202 and the power stage circuit 1203 in the DC-DC converter can be buck switching regulators as shown in FIGS. 12A and 12B; boost switching regulators as shown in FIGS. 13A and 13B; inverting switching regulators as shown in FIGS. 14A and 14B; buck-boost switching regulators as shown in FIGS. 15A and 15B; or inverting-boost switching regulators as shown in FIGS. 16A and 16B. The output voltage Vout in the figures can be used as the voltage VLED, but this does not mean that the DC-DC converter must provide a constant voltage (that is, the voltage VLED does not have to be a fixed voltage).

Figure 17:
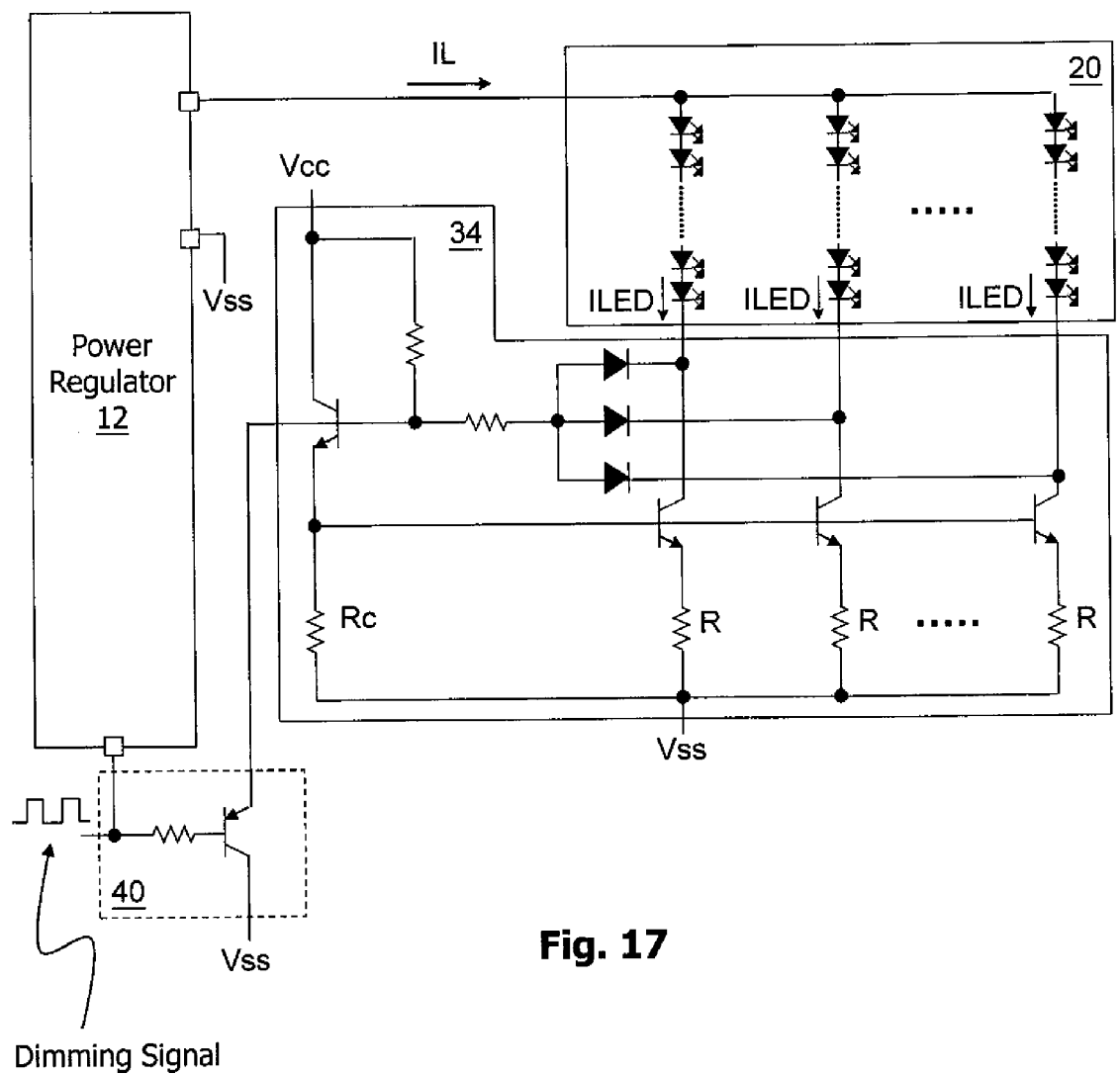
FIG. 17 shows another embodiment of the present invention.

FIG. 17 shows another embodiment of the present invention, which further includes a dimming circuit 40 coupled to the current splitter circuit 34. The dimming circuit 40 receives a dimming signal (for example a pulse width modulated signal) and modulates the minimum signal outputted by the minimum selector circuit 342 according to the dimming signal, whereby the current control signal is also modulated, so as to control the brightness of the light emitting device array 20. When the dimming signal is a pulse width modulated signal, the dimming circuit 40 switches ON and OFF the minimum signal (and thus the current control signal), so that the average brightness of the light emitting device array 20 is controlled by a duty ratio of the dimming signal.

Figure 18:
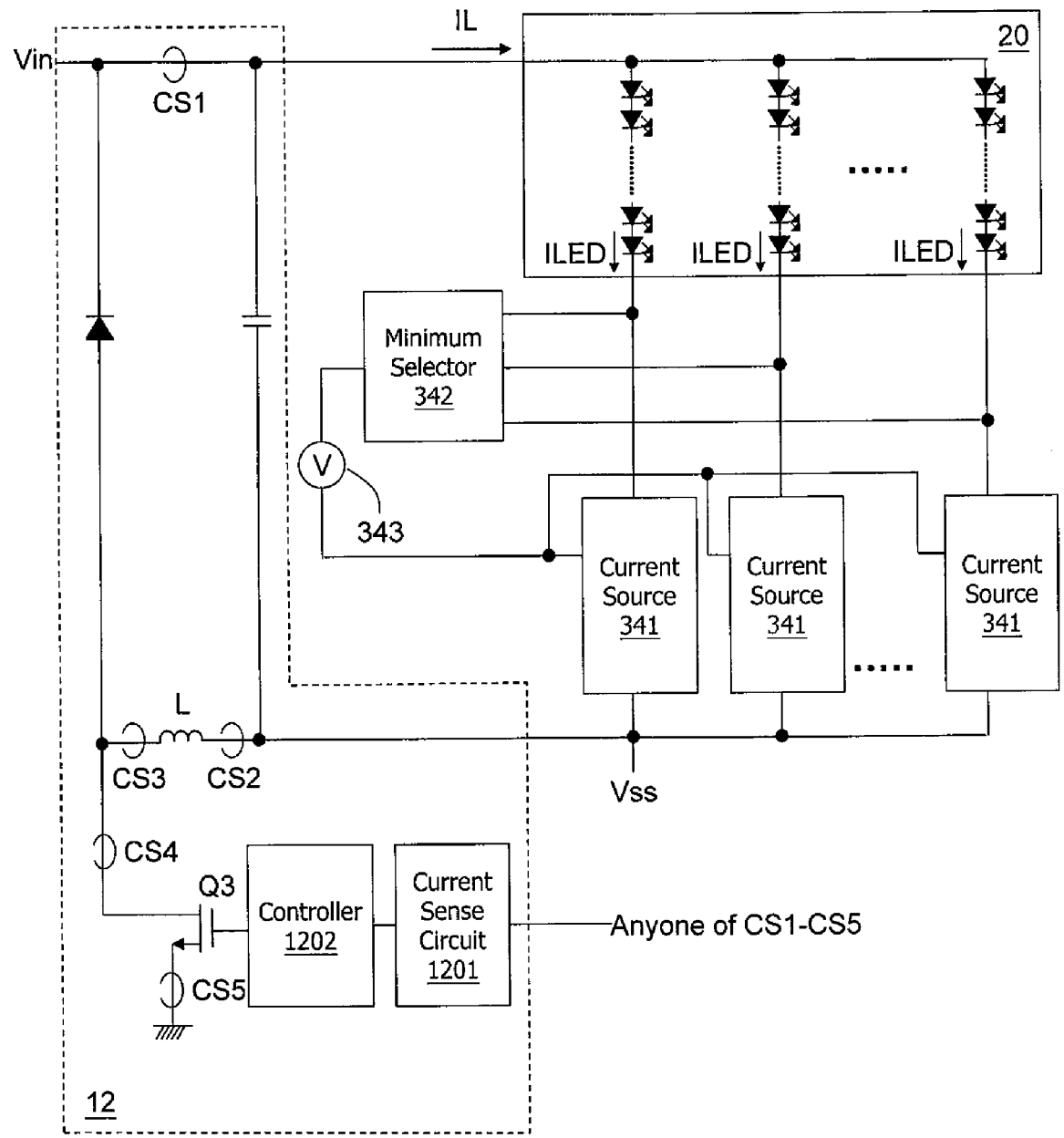
FIG. 18 shows a further other embodiment of the present invention.

FIG. 18 shows another embodiment of the present invention, which illustrates another embodiment of the power regulator 12 and possible locations for sensing the supply current. As shown in the figure, in the power regulator 12, the current sense circuit 1201 senses the supply current, and the controller 1202 controls the power switch Q3 according to the sensed current, so that a regulated supply current IL is supplied to the light emitting device array 20. The location for sensing the supply current for example can be the location CS1, CS2, CS3, CS4 or CS5 as shown in the figure.

Figure 19:
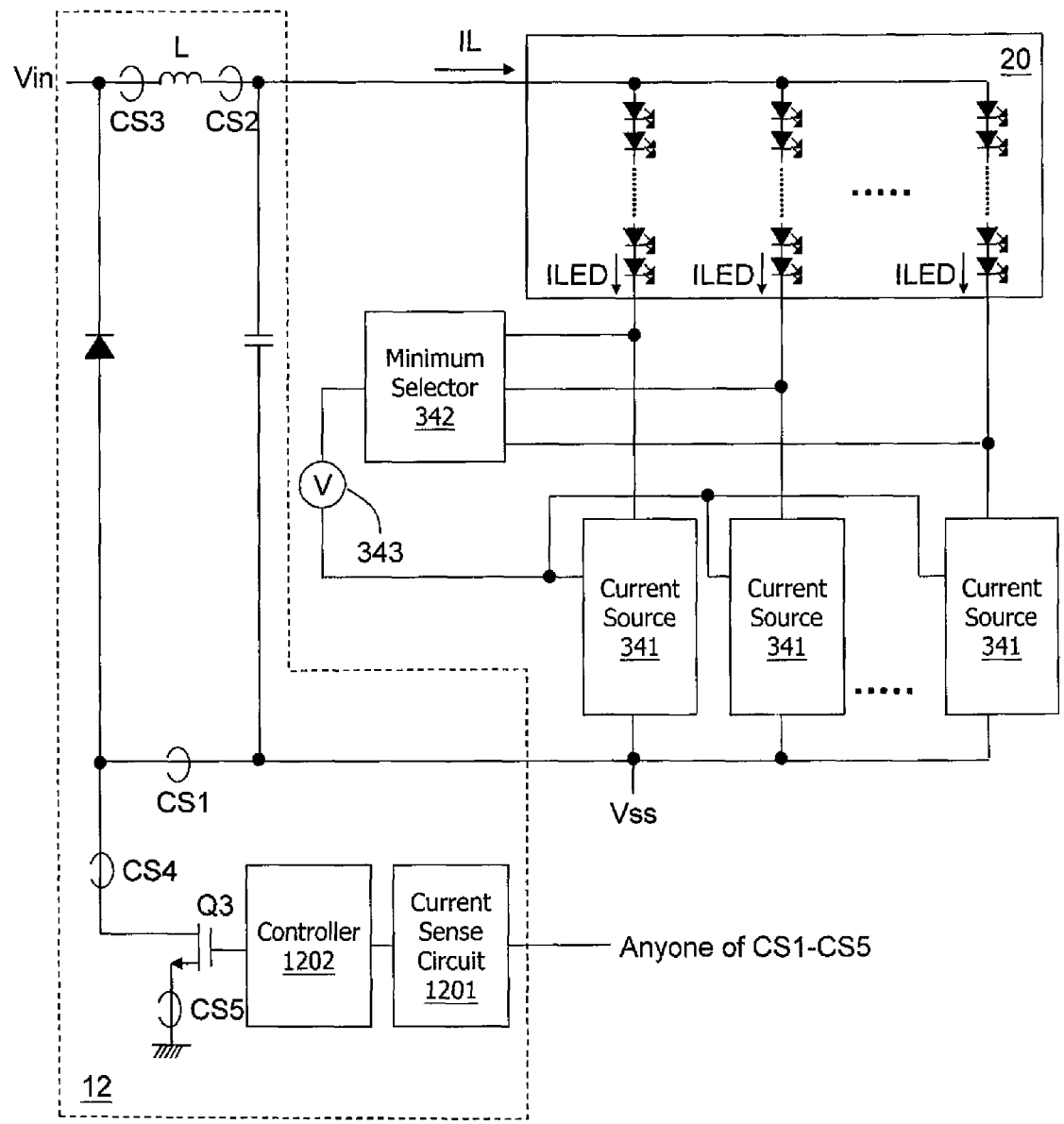
FIG. 19 shows yet another embodiment of the present invention.

FIG. 19 shows another embodiment of the present invention, in which the inductor L is located at a different location from that in the previous embodiment. The location for sensing the supply current for example can be the location CS1, CS2, CS3, CS4 or CS5 as shown in the figure.

If the current source circuits 341 in the embodiment of FIG. 3 are replaced by the current source circuits 341 in FIG. 5A or 5B, and if the transistor Q1 or Q2 can not be integrated with the other devices of the current splitter circuit 34 and has to be provided external to the IC chip, then the IC chip has to provide three pins for each light emitting device string, for connecting with three ends of the transistor Q1 or Q2, i.e., the node N1-NN, the base of the transistor Q1 or the gate of the transistor Q2, and the emitter of the transistor Q1 or the source of the transistor Q2. The signal from the node N1-NN is for determining which light emitting device string has the highest voltage drop and providing the corresponding node voltage information, and the other two ends of the transistor Q1 or Q2 are necessary connections for forming a current source circuit. Under such circumstance, if there is an internal signal which can replace the signal from the node N1-NN and provides an equivalent effect, the number of pins of the IC chip can be greatly reduced.

Figure 20A:
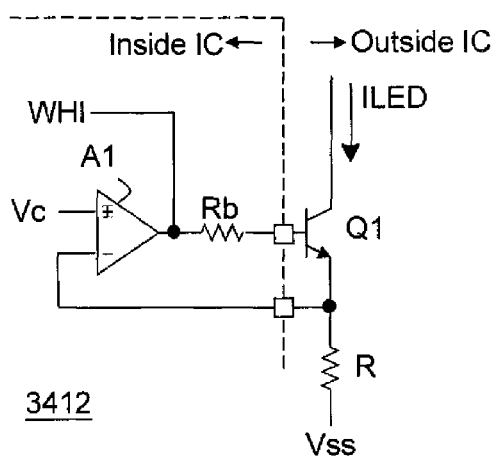
FIGS. 20A and 20B show more specific embodiments of the current source circuit 3412.
Figure 20B:
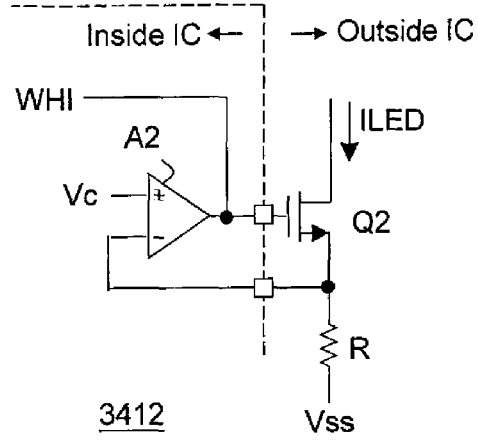

In this regard, please refer to FIGS. 20A and 20B in comparison with FIGS. 5A and 5B. The current source circuits 3412 shown in FIGS. 20A and 20B are different from the current source circuits 341 in FIGS. 5A and 5B in that the signal for determining which light emitting device string has the highest voltage drop is not taken from the node N1-NN, but from the control end of the transistor Q1 or Q2 of the current source circuit 3412 (the base of the transistor Q1 or the gate of the transistor Q2), which is referred to as the signal WHI (working headroom index). For better signal accuracy, in the circuit of FIG. 20A, the transistor Q1 should preferably operate in the slight saturation region, and preferably a resistor Rb is connected to its base; in the circuit of FIG. 20B, the transistor Q2 should preferably operate in the linear region.

The signal WHI is different from the signal obtained from the node N1-NN. More specifically, taking the circuit of FIG. 20B as an example, if the voltage at the node N1-NN is low, the drain to source voltage difference of the transistor Q2 is low, and for maintaining a desired current level, the gate voltage of the transistor Q2 has to be increased. In other words, for a lowest voltage among the nodes N1-NN, the corresponding transistor Q2 will have a highest gate voltage. Similarly, in the circuit of FIG. 20A, for a lowest voltage among the nodes N1-NN, the corresponding transistor Q1 will have a largest base current and thus the highest WHI voltage. Therefore, in all of the light emitting device strings, the one corresponding to the highest one of the signals WHI has the highest voltage drop, and the current splitter circuit 34 should generate the current control signal to control the current source circuits 3412 according to the highest WHI signal.

In FIGS. 20A and 20B, each current source circuit 3412 includes a first current source end, a second current source end, a voltage control end, and a working headroom index end. The first current source end is coupled to the second end of a corresponding light emitting device string. The second current source end is coupled to the ground level (Vss). The voltage control end receives the current control signal Vc for controlling the current through the current source circuit 3412. The working headroom index end outputs the signal WHI, which relates to the voltage at the second end of the corresponding light emitting device string.

Figure 21:
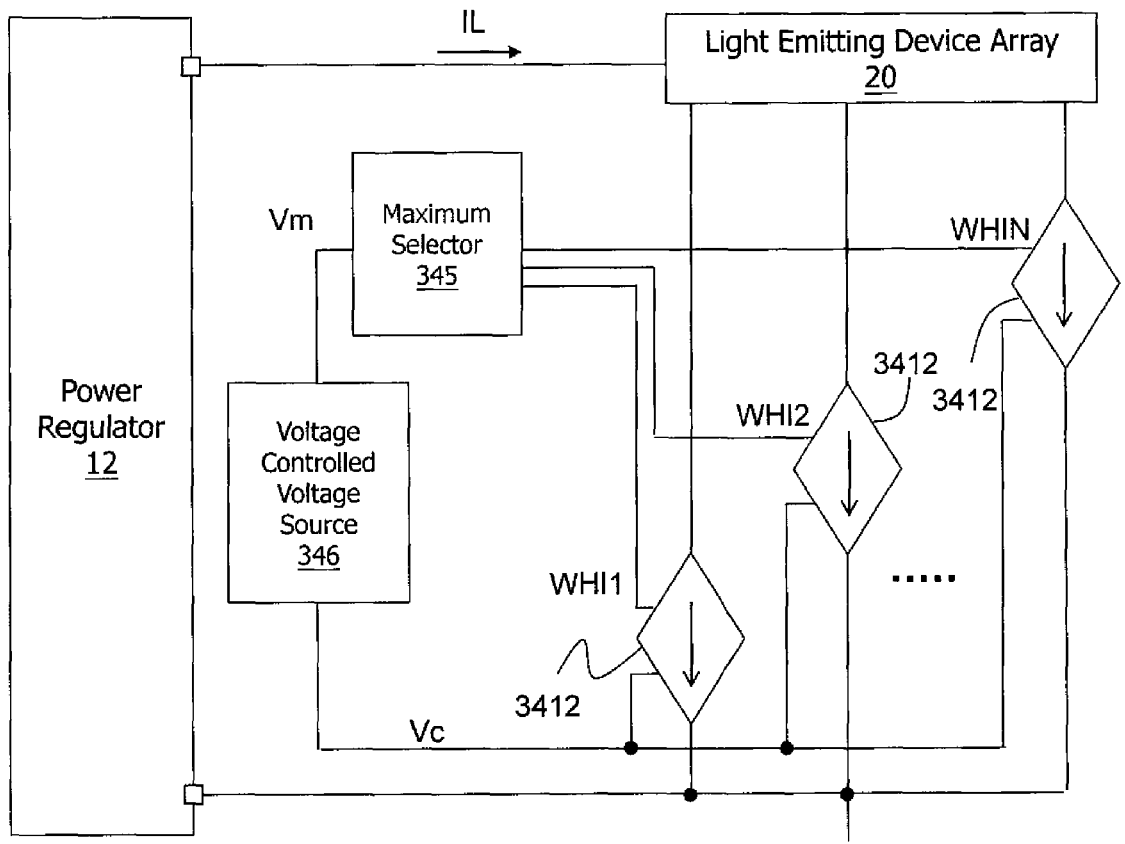
FIG. 21 shows another embodiment of the present invention.

FIG. 21 shows an embodiment using the current source circuits 3412, wherein the current source circuits 3412 are illustrated by a simplified form having four ends. The embodiment of FIG. 21 is different from all previous embodiments in that the current splitter circuit 34 includes a maximum selector circuit 345 instead of a minimum selector circuit 342; the maximum selector circuit 345 receive multiple signals WHI1-WHIN and outputs a maximum signal Vm indicating a highest voltage among the signals WHI1-WHIN (the maximum signal Vm may be equal to this highest voltage, or equal to this highest voltage plus a bias voltage). The maximum signal Vm is used to generate the current control signal Vc through a voltage-controlled voltage source circuit 346.

Figure 22A:
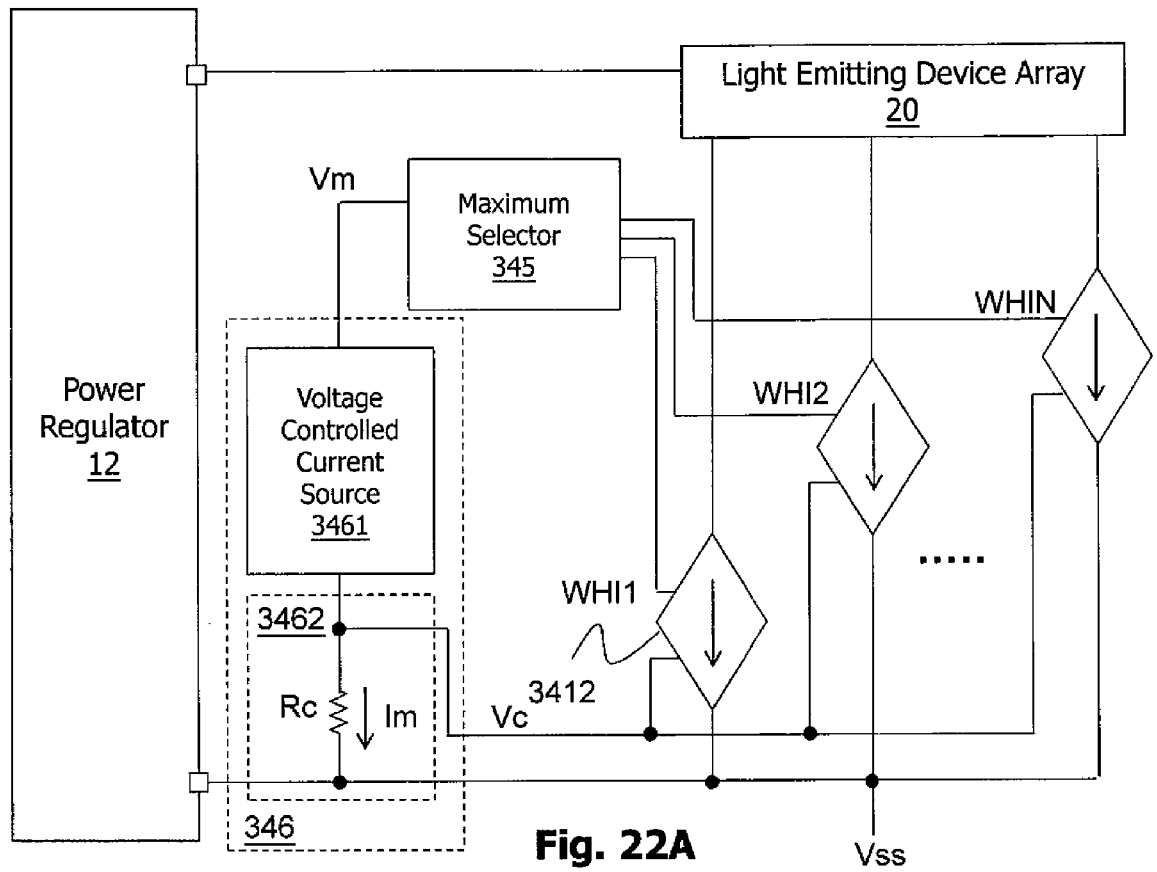
FIG. 22A shows a more specific embodiment of the voltage-controlled voltage source circuit 346.

FIG. 22A shows another embodiment of the present invention. In this embodiment, the voltage-controlled voltage source circuit 346 includes a voltage-controlled current source circuit 3461 coupled to the maximum selector circuit 345 for receiving the maximum signal Vm and generating a maximum current Im according to the maximum signal Vm; and a current-to-voltage conversion circuit 3462, embodied for example as but not limited to a resistor Rc as shown in the figure, coupled to the voltage-controlled current source circuit 3461 and the control ends of the current source circuits 3412, for converting the maximum current Im to the current control signal Vc.

Figure 22B:
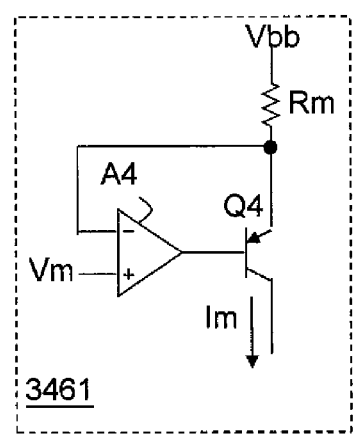
FIGS. 22B and 22C show more specific embodiments of the voltage-controlled current source circuit 3461.
Figure 22C:
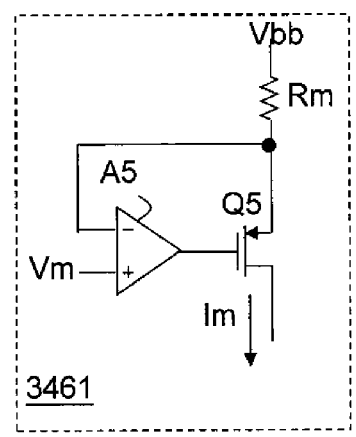

FIGS. 22B-22C show embodiments of the voltage-controlled current source circuit 3461. In FIG. 22B, the voltage-controlled current source circuit 3461 includes an amplifier A4, a transistor Q4 and a resistor Rm; in FIG. 22C, the voltage-controlled current source circuit 3461 includes an amplifier A5, a transistor Q5 and a resistor Rm. The two inputs of the amplifier (A4 or A5) receive the voltage at the current inflow end of the transistor (Q4 or Q5) and the maximum signal Vm; the output of the amplifier (A4 or A5) controls the control end of the transistor (Q4 or Q5). At balanced state, the voltage at the current inflow end of the transistor (Q4 or Q5) is equal to the maximum signal Vm, so the current Im is equal to the voltage across the resistor Rm (Vbb-Vm) divided by the resistance of the resistor Rm, wherein the voltage Vbb is a constant voltage larger than Vm. It can be understood from comparison between FIGS. 22B-22C and FIGS. 5A-5B that the type of the transistor and the location for connecting the resistor can be modified as required; in fact, the voltage-controlled current source circuit 3461 and the current source circuit 341 are similar circuits.

Figure 23:
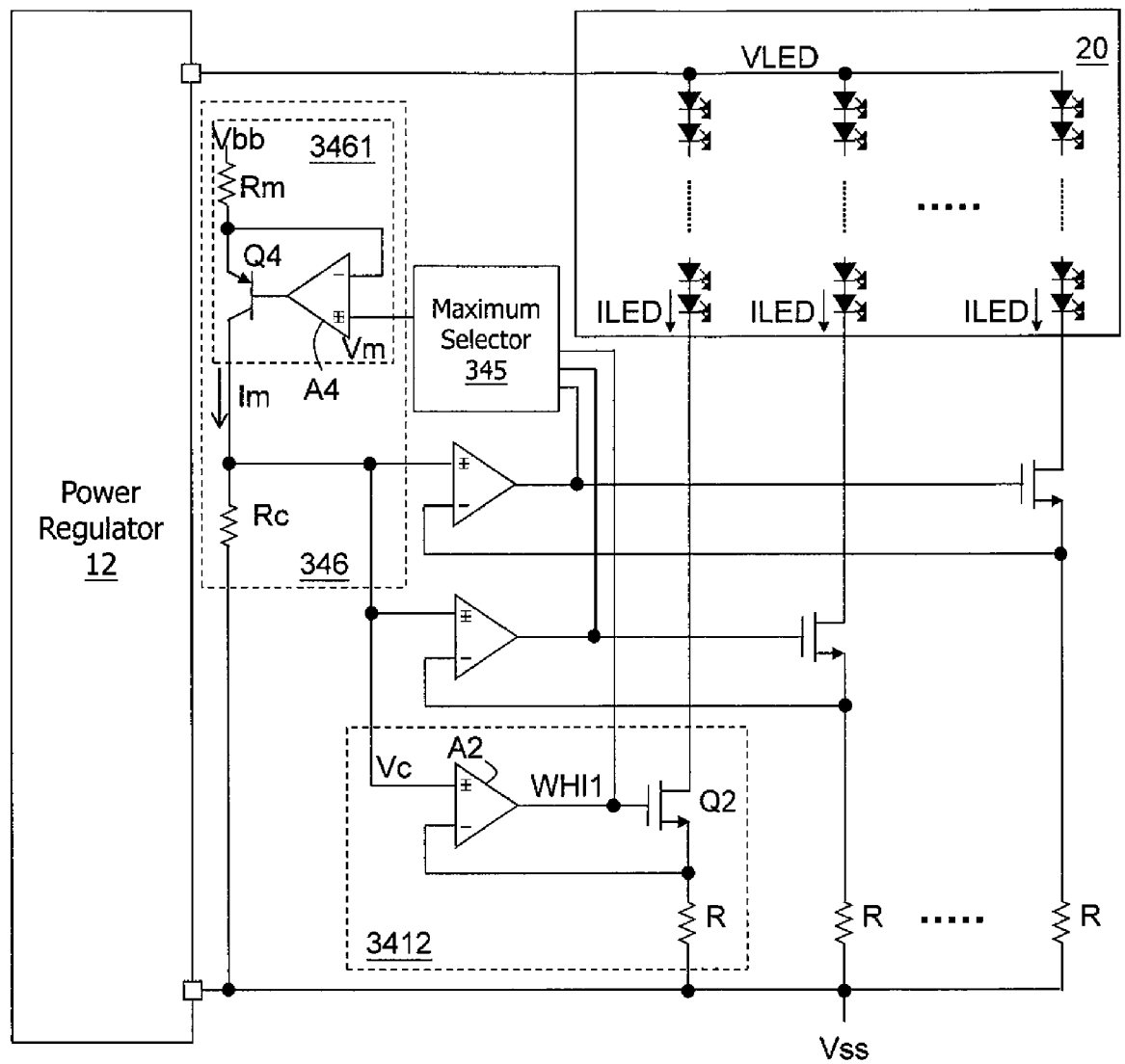
FIG. 23 shows a more specific embodiment of the present invention.

FIG. 23 shows a more specific embodiment if the present invention, which adopts the current source circuit 3412 shown in FIG. 20B and the voltage-controlled current source circuit 3461 shown in FIG. 22B.

FIGS. 24A-24E show several embodiments of the maximum selector circuit 345. As shown in FIGS. 24A and 24B, the maximum selector circuit 345 may include multiple diodes D1-DN having anodes coupled to the working headroom index ends of the current source circuits 3412 respectively for receiving the signals WHI1-WHIN, and cathodes coupled to the output of the maximum selector circuit 345 in common; and a current source CR1 (FIG. 24A) or a resistor Rw (FIG. 24B), coupled between the output of the maximum selector circuit 345 and the ground level Vss.

FIG. 24C shows another embodiment of the maximum selector circuit 345, which includes multiple NPNBJT Qm1-Qmn having bases (control ends) coupled to the working headroom index ends respectively for receiving the signals WHI1-WHIN, collectors (current inflow ends) coupled to the voltage Vcc in common, and emitters (current outflow ends) coupled to a common emitter node in common for outputting the maximum signal Vm; and a current source CR2 coupled between the common emitter node and the ground level Vss. The current source CR2 can be replaced by a resistor.

FIG. 24D shows another embodiment of the maximum selector circuit 345, which includes multiple N-tpe transistors such as N-channel FETs or NPNBJT Qn1-Qnn having gates or bases (control ends) coupled to the working headroom index ends respectively for receiving the signals WHI1-WHIN, sources or emitters (current outflow ends) coupled to a common source (or emitter) node in common, and drains or collectors (current inflow ends) coupled to a common drain (or collector) node in common; a differential amplifier A6 which receives current inputs in this embodiment, the differential amplifier A6 having a first input coupled to the common drain (or collector) node, and an output for outputting the maximum signal Vm; an N-type transistor Q6 having a drain or collector (current inflow end) coupled to a second input of the differential amplifier A6, a source or emitter (current outflow end) coupled to the common source (or emitter) node, and a gate or base (control end) coupled to the output of the differential amplifier A6; and a current source CR3 coupled between the common source (or emitter) node and the ground level Vss. FIG. 24E shows an embodiment similar to FIG. 24D, except that the maximum selector circuit 345 further includes a bias circuit VS coupled between the output of the differential amplifier A6 and the gate (or base) of the transistor Q6, for providing a bias voltage to adjust the maximum signal Vm. In the above embodiments of FIGS. 24D and 24E, the current source CR3 can be replaced by a resistor.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, in the embodiments of FIGS. 21, 22A and 23, a gain circuit 344 can be interposed between the maximum selector circuit 345 and the voltage-controlled voltage source circuit 346. For another example, a device or circuit which does not substantially influence the primary function of a signal can be inserted between any two devices or circuits shown to be in direction connection in the embodiments. For yet another example, the signal indicating the voltage drop of a light emitting device string can be obtained at locations other than the node N1-NN or the drain (collector) or gate (base) of a transistor. For another example, the transistor in a current source circuit can be a BJT or a FET. For yet another example, the light emitting devices are not limited to LEDs as shown in the figure, but can be other light emitting devices such as organic LEDs. In view of the foregoing, the spirit of the present invention should cover all such and other modifications and variations, which should be interpreted to fall within the scope of the following claims and their equivalents.

What is claimed is:

1. A light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit comprising:
   a power regulator circuit electrically connected with the common node and a ground, for supplying a supply current to the light emitting device array by sensing the supply current and feedback controlling the supply current; and
   a current splitter circuit for splitting the supply current among the light emitting device strings, the current splitter circuit comprising:
      a minimum selector circuit coupled to the second string ends of the light emitting device strings to sense voltages at the second string ends of the light emitting device strings, and generate a minimum signal which indicates a lowest voltage of the sensed voltages at the second string ends of the light emitting device strings; and
      a plurality of current source circuits, each current source circuit including: a first current source end, a second current source end, and a current source control end, wherein the first current source ends of the plurality of current source circuits are respectively coupled to the second string ends of the plurality of light emitting device strings; the second current source ends of the plurality of current source circuits are coupled to the ground; and the current source control ends of the plurality of current source circuits receive a current control signal related to the minimum signal, so as to control currents through the plurality of current source circuits and thereby control currents through the plurality of light emitting device strings.

2. The light emitting device array driver circuit as claimed in claim 1, wherein the current splitter circuit further comprises a first bias circuit having one end coupled to the minimum selector circuit and the other end coupled to the plurality of current source control ends, for providing a first bias voltage to adjust the current control signal.

3. The light emitting device array driver circuit as claimed in claim 1, wherein the minimum selector circuit comprises a plurality of second bias circuits coupled to the second string ends respectively.

4. The light emitting device array driver circuit as claimed in claim 1, wherein the current splitter circuit further comprises an amplifier having a first input end, a second input end and an output end, the first input end being coupled to the minimum selector circuit for receiving the minimum signal, the second input end being coupled to the output end at an output node, and the output node being coupled to the plurality of current source control ends.

5. The light emitting device array driver circuit as claimed in claim 4, wherein the current splitter circuit further comprises a first bias circuit coupled between the first input end and the minimum selector circuit, or coupled between the second input end and the output end, or coupled between the output node and the plurality of current source control ends.

6. The light emitting device array driver circuit as claimed in claim 3, wherein each of the second bias circuits is one or a combination of the following devices: diode, Schottky diode, PNP bipolar transistor (BJT) having a collector coupled to the ground, PNP BJT having a collector coupled to a base thereof, NPN BJT having a collector coupled to a supply voltage, and NPN BJT having a collector coupled to a base thereof.

7. The light emitting device array driver circuit as claimed in claim 2, wherein the first bias circuit comprises:
   a third bias circuit having one end coupled to the minimum selector circuit;
   a fourth bias circuit having a first end coupled to another end of the third bias circuit at a connection node and a second end coupled to the plurality of current source control ends;
   a first device having a first end coupled to a positive voltage and a second end coupled to the connection node; and
   a second device having a first end coupled to the second end of the fourth bias circuit and a second end coupled to the ground.

8. The light emitting device array driver circuit as claimed in claim 7, wherein the fourth bias circuit is a BJT having a base which is the first end, an emitter which is the second end, and a collector which is coupled to the positive voltage.

9. The light emitting device array driver circuit as claimed in claim 7, wherein the third bias circuits is one or a combination of the following devices: resistor, diode, Schottky diode, PNP bipolar transistor (BJT) having a collector coupled to the ground, PNP BJT having a collector coupled to a base thereof, NPN BJT having a collector coupled to a supply voltage, and NPN BJT having a collector coupled to a base thereof.

10. The light emitting device array driver circuit as claimed in claim 7, wherein the first device or the second device includes a resistor, a constant current source, or a combination of a resistor and a constant current source.

11. The light emitting device array driver circuit as claimed in claim 1, further comprising a dimming circuit coupled to the current splitter circuit, the dimming circuit receiving a dimming signal and modulating the current control signal according to the dimming signal to control the brightness of the light emitting device array.

12. The light emitting device array driver circuit as claimed in claim 1, wherein each of the current source circuits comprises:

a transistor having a current inflow end, a current outflow end and a control end, the current inflow end being the first current source end;
an amplifier having an output end controlling the control end of the transistor, the amplifier having a first input end which is the current source control end, and a second input end which is coupled to the current outflow end of the transistor; and
a resistor having a first end coupled to the current outflow end of the transistor, and a second end which is the second current source end.

13. The light emitting device array driver circuit as claimed in claim 1, wherein the power regulator circuit comprises:
a current sense circuit for sensing the supply current;
a controller for generating a control signal according to an output from the current sense circuit; and
a power stage circuit for generating the supply current according to the control signal.

14. A current splitter circuit for use in a light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit including a power regulator circuit electrically connected with the common node and a ground, for supplying a supply current to the light emitting device array by sensing the supply current and feedback controlling the supply current; the current splitter circuit splitting the supply current among the light emitting device strings, the current splitter circuit comprising:
a minimum selector circuit coupled to the second string ends of the light emitting device strings to sense voltages at the second string ends of the light emitting device strings, and generate a minimum signal which indicates a lowest voltage of the sensed voltages at the second string ends of the light emitting device strings; and
a plurality of current source circuits, each current source circuit including: a first current source end, a second current source end, and a current source control end, wherein the first current source ends of the plurality of current source circuits are respectively coupled to the second string ends of the plurality of light emitting device strings; the second current source ends of the plurality of current source circuits are coupled to the ground; and the current source control ends of the plurality of current source circuits receive a current control signal related to the minimum signal, so as to control currents through the plurality of current source circuits and thereby control currents through the plurality of light emitting device strings.

15. The current splitter circuit as claimed in claim 14, further comprising a first bias circuit having one end coupled to the minimum selector circuit and the other end coupled to the plurality of current source control ends, for providing a first bias voltage to adjust the current control signal.

16. The current splitter circuit as claimed in claim 15, wherein the minimum selector circuit comprises a plurality of second bias circuits coupled to the second string ends respectively.

17. The current splitter circuit as claimed in claim 15, further comprising an amplifier having a first input end, a second input end and an output end, the first input end being coupled to the minimum selector circuit for receiving the minimum signal, the second input end being coupled to the output end at an output node, and the output node being coupled to the plurality of current source control ends.

18. The current splitter circuit as claimed in claim 17, further comprising a first bias circuit coupled between the first input end and the minimum selector circuit, or coupled between the second input end and the output end, or coupled between the output node and the plurality of current source control ends.

19. The current splitter circuit as claimed in claim 16, wherein each of the second bias circuits is one or a combination of the following devices: diode, Schottky diode, PNP bipolar transistor (BJT) having a collector coupled to the ground, PNPBJT having a collector coupled to a base thereof, NPNBJT having a collector coupled to a supply voltage, and NPNBJT having a collector coupled to a base thereof.

20. The current splitter circuit as claimed in claim 15, wherein the first bias circuit comprises:
a third bias circuit having one end coupled to the minimum selector circuit;
a fourth bias circuit having a first end coupled to another end of the third bias circuit at a connection node and a second end coupled to the plurality of current source control ends;
a first device having a first end coupled to a positive voltage and a second, end coupled to the connection node; and
a second device having a first end coupled to the second end of the fourth bias circuit and a second end coupled to the ground.

21. The current splitter circuit as claimed in claim 20, wherein the fourth bias circuit is a BJT having a base which is the first end, an emitter which is the second end, and a collector which is coupled to the positive voltage.

22. The current splitter circuit as claimed in claim 20, wherein the third bias circuits is one or a combination of the following devices: resistor, diode, Schottky diode, PNP bipolar transistor (BJT) having a collector coupled to the ground, PNPBJT having a collector coupled to a base thereof, NPNBJT having a collector coupled to a supply voltage, and NPNBJT having a collector coupled to a base thereof.

23. The current splitter circuit as claimed in claim 20, wherein the first device or the second device includes a resistor, a constant current source, or a combination of a resistor and a constant current source.

24. The current splitter circuit as claimed in claim 14, wherein the current splitter circuit is coupled to a dimming circuit, the dimming circuit receiving a dimming signal and modulating the current control signal according to the dimming signal, and the current splitter circuit controls the brightness of the light emitting device array according to the adjusted minimum signal.

25. The current splitter circuit as claimed in claim 14, wherein each of the current source circuits comprises:
a transistor having a current inflow end, a current outflow end and a control end, the current inflow end being the first current source end;
an amplifier having an output end controlling the control end of the transistor, the amplifier having a first input end which is the current source control end, and a second input end which is coupled to the current outflow end of the transistor; and
a resistor having a first end coupled to the current outflow end of the transistor, and a second end which is the second current source end.

26. A light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit comprising:
- a power regulator circuit electrically connected with the common node and a ground, for supplying a supply current to the light emitting device array by sensing the supply current and feedback controlling the supply current; and
- a current splitter circuit for splitting the supply current among the light emitting device strings, the current splitter circuit comprising:
  - a plurality of first current source circuits, each first current source circuit including: a first current source end, a second current source end, a voltage control end, and an index end, wherein the first current source ends of the plurality of first current source circuits are respectively coupled to the second string ends of the plurality of light emitting device strings; the second current source ends of the plurality of first current source circuits are coupled to the ground; the voltage control ends of the plurality of first current source circuits receive a current control signal related to a maximum signal, so as to control currents through the plurality of first current source circuits and thereby control currents through the plurality of light emitting device strings; and the index ends of the plurality of first current source circuits output a plurality of indices relating to voltages at the second string ends of the light emitting device strings respectively;
  - a maximum selector circuit coupled to the index ends and outputting the maximum signal indicating a highest voltage of the indices; and
  - a voltage-controlled voltage source circuit coupled to the maximum selector circuit for generating the current control signal according to the maximum signal.

27. The light emitting device array driver circuit as claimed in claim 26, wherein the voltage-controlled voltage source circuit comprises:
- a voltage-controlled current source circuit coupled to the maximum selector circuit for receiving the maximum signal and generating a maximum current; and
- a current-to-voltage conversion circuit coupled between the voltage-controlled current source circuit and the voltage control ends of the plurality of first current source circuits, the current-to-voltage conversion circuit converting the maximum current to the current control signal.

28. The light emitting device array driver circuit as claimed in claim 26, wherein each of the first current source circuits comprises:
- a transistor having a current inflow end, a current outflow end and a control end, the current inflow end being the first current source end, the control end being coupled to the index end;
- an amplifier having an output end controlling the control end of the transistor, the amplifier having a first input end which is the voltage control end, and a second input end which is coupled to the current outflow end of the transistor; and
- a resistor having a first end coupled to the current outflow end of the transistor, and a second end which is the second current source end.

29. The light emitting device array driver circuit as claimed in claim 28, wherein the transistor includes a field effect transistor (FET).

30. The light emitting device array driver circuit as claimed in claim 28, wherein the transistor includes a BJT having an emitter which is the current outflow end, a base which is the current inflow end, and a base which is the control end, and wherein the current source circuit further comprises a resistor coupled between the base and the index end.

31. The light emitting device array driver circuit as claimed in claim 26, wherein the maximum selector circuit comprises:
- a plurality of diodes having anodes coupled to the index ends respectively to receive the indices, and cathodes coupled to a maximum selector circuit output end to output the maximum signal; and
- a second current source or a resistor coupled between the maximum selector circuit output end and the ground.

32. The light emitting device array driver circuit as claimed in claim 26, wherein the maximum selector circuit comprises:
- a plurality of first N-type transistors each having a control end coupled to a corresponding one of the index ends, a current outflow end coupled to a first common node, and a current inflow end coupled to a second common node;
- a differential amplifier circuit having an input end coupled to the second common node, and an output end for outputting the maximum signal;
- a second N-type transistor having a current inflow end coupled to another input end of the differential amplifier circuit, a current outflow end coupled to the first common node, and a control end coupled to the output end of the differential amplifier circuit; and
- a second current source coupled between the first common node and the ground.

33. The light emitting device array driver circuit as claimed in claim 32, wherein the maximum selector circuit further comprises a bias circuit coupled between the output end of the differential amplifier circuit and the control end of the second N-type transistor, to provide a bias voltage.

34. The light emitting device array driver circuit as claimed in claim 26, wherein the maximum selector circuit comprises:
- a plurality of BJTs each having a base coupled to a corresponding one of the index ends, a collector coupled to a supply voltage, and an emitter coupled to a common emitter node for outputting the maximum signal; and
- a second current source or a resistor coupled between the emitter common node and the ground.

35. A current splitter circuit for use in a light emitting device array driver circuit, the light emitting device array including a plurality of light emitting device strings, each light emitting device string including a plurality of light emitting devices and having a first string end and a second string end, the first string ends of the light emitting device strings being connected to a common node, the light emitting device array driver circuit including a power regulator circuit electrically connected with the common node and a ground, for supplying a supply current to the .light emitting device array by sensing the supply current and feedback controlling the supply current; the current splitter circuit splitting the supply current among the light emitting device strings, the current splitter circuit comprising:
- a plurality of first current source circuits, each first current source circuit including: a first current source end, a second current source end, a voltage control end, and an index end, wherein the first current source ends of the plurality of first current source circuits are respectively coupled to the second string ends of the plurality of light emitting device strings; the second current source ends of the plurality of first current source circuits are coupled to the ground; the voltage control ends of the plurality of first current source circuits receive a current control signal related to a maximum signal, so as to control currents through the plurality of first current source circuits and thereby control currents through the plurality of light emitting device strings; and the index ends of the plurality of first current source circuits output a plurality of indices relating to voltages at the second string ends of the light emitting device strings respectively;

a maximum selector circuit coupled to the index ends and outputting the maximum signal indicating a highest voltage of the indices; and a voltage-controlled voltage source circuit coupled to the maximum selector circuit for generating the current control signal according to the maximum signal.

36. The current splitter circuit as claimed in claim 35, wherein the voltage-controlled voltage source circuit comprises:

a voltage-controlled current source circuit coupled to the maximum selector circuit for receiving the maximum signal and generating a maximum current; and a current-to-voltage conversion circuit coupled between the voltage-controlled current source circuit and the voltage control ends of the plurality of first current source circuits, the current-to-voltage conversion circuit converting the maximum current to the current control signal.

37. The current splitter circuit as claimed in claim 35, wherein each of the first current source circuits comprises:

a transistor having a current inflow end, a current outflow end and a control end, the current inflow end being the first current source end, the control end being coupled to the index end;

an amplifier having an output end controlling the control end of the transistor, the amplifier having a first input end which is the voltage control end, and a second input end which is coupled to the current outflow end of the transistor; and a resistor having a first end coupled to the current outflow end of the transistor, and a second end which is the second current source end.

38. The current splitter circuit as claimed in claim 37, wherein the transistor includes a field effect transistor (FET).

39. The current splitter circuit as claimed in claim 37, wherein the transistor includes a BJT having an emitter which is the current outflow end, a base which is the current inflow end, and a base which is the control end, and wherein the current source circuit further comprises a resistor coupled between the base and the index end.

40. The current splitter circuit as claimed in claim 35, wherein the maximum selector circuit comprises:

a plurality of diodes having anodes coupled to the index ends respectively to receive the indices, and cathodes coupled to a maximum selector circuit output end to output the maximum signal; and a second current source or a resistor coupled between the maximum selector circuit output end and the ground.

41. The current splitter circuit as claimed in claim 35, wherein the maximum selector circuit comprises:

a plurality of first N-type transistors each having a control end coupled to a corresponding one of the index ends, a current outflow end coupled to a first common node, and a current inflow end coupled to a second common node;

a differential amplifier circuit having an input end coupled to the second common node, and an output end for outputting the maximum signal;

a second N-type transistor having a current inflow end coupled to another input end of the differential amplifier circuit, a current outflow end coupled to the first common node, and a control end coupled to the output end of the differential amplifier circuit; and a second current source coupled between the first common node and the ground.

42. The current splitter circuit as claimed in claim 41, wherein the maximum selector circuit further comprises a bias circuit coupled between the output end of the differential amplifier circuit and the control end of the second N-type transistor, to provide a bias voltage.

43. The current splitter circuit as claimed in claim 35, wherein the maximum selector circuit comprises:

a plurality of BJTs each having a base coupled to a corresponding one of the index ends, a collector coupled to a supply voltage, and an emitter coupled to a common emitter node for outputting the maximum signal; and a second current source or a resistor coupled between the emitter common node and the ground.

44. A method for splitting current in a light emitting device array, the light emitting device array including a plurality of light emitting device strings, each light emitting device string including a plurality of light emitting devices and having a first string end and a second string end, the first string ends of the light emitting device strings being connected to a common node, the method comprising:

providing a total supply current to the common node;

regulating the total supply current according to a sense signal sensing the total supply current;

sensing voltages at the second string ends of the light emitting device strings and outputting a minimum signal which indicates a lowest voltage of the sensed voltages at the second string ends of the light emitting device strings;

generating a current control signal relating to the minimum signal; and controlling currents through the light emitting device strings according to the current control signal, so as to split the total supply current to the light emitting device strings.

45. The method as claimed in claim 44, further comprising adding a first bias voltage to the minimum signal to adjust the current control signal.

46. The method as claimed in claim 45, wherein the step of outputting the minimum signal comprises: adding a second bias voltage to the lowest voltage among the sensed voltages at the second string ends.

47. The method as claimed in claim 44, further comprising providing a dimming signal to modulate the current control signal, so as to control the brightness of the light emitting device array.

48. A method for splitting current in a light emitting device array, the light emitting device array including a plurality of light emitting device strings, each light emitting device string including a plurality of light emitting devices and having a first string end and a second string end, the first string ends of the light emitting device strings being connected to a common node, the method comprising:

providing a total supply current to the common node;

regulating the total supply current according to a sense signal sensing the total supply current;

generating a plurality of indices relating to voltages at the second string ends of the light emitting device strings respectively;

generating a maximum signal indicating a highest voltage of the indices, which relates to the lowest voltage at the second string ends of the light emitting device strings;

generating a current control signal according to the maximum signal; and controlling currents through the light emitting device strings according to the current control signal.

49. The method as claimed in claim 48, wherein the step of generating a current control signal according to the maximum signal comprises:
   generating a maximum current according to the maximum signal; and
   converting the maximum current to a voltage signal for use as the current control signal.

* * * * *